US012710543B2

(12) United States Patent
Tachwali et al.

(10) Patent No.: US 12,710,543 B2
(45) Date of Patent: Aug. 18, 2026

(54) SYSTEMS AND METHODS FOR VARIABLE-RESOLUTION REFINEMENT OF GEIGER MODE LIDAR

(71) Applicant: LG INNOTEK CO., LTD., Seoul (KR)

(72) Inventors: Yahia Tachwali, Princeton, NJ (US); Jiye Lee, Pittsburgh, PA (US); Michael Schoenberg, Seattle, WA (US)

(73) Assignee: LG INNOTEK CO., LTD., Seoul (KR)

( * ) Notice: Subject to any disclaimer, the term of this patent is extended or adjusted under 35 U.S.C. 154(b) by 981 days.

(21) Appl. No.: 18/045,866

(22) Filed: Oct. 12, 2022

(65) Prior Publication Data

US 2024/0125940 A1 Apr. 18, 2024

(51) Int. Cl.
*G01S 17/931* (2020.01)
*G01S 17/89* (2020.01)

(52) U.S. Cl.
CPC ............ *G01S 17/931* (2020.01); *G01S 17/89* (2013.01)

(58) Field of Classification Search
CPC .... G01S 7/4815; G01S 7/4817; G01S 7/4865; G01S 7/487; G01S 17/10; G01S 17/42; G01S 17/89; G01S 17/931
USPC ............................................................ 365/5.1
See application file for complete search history.

(56) References Cited

U.S. PATENT DOCUMENTS 10,976,417 B2 * 4/2021 LaChapelle ........... G01S 7/4816
2017/0299721 A1 * 10/2017 Eichenholz ........... H01S 3/0078
2018/0180739 A1 * 6/2018 Droz ........................ G01S 17/04
2018/0284234 A1 * 10/2018 Curatu ................ B60W 60/001
2018/0284275 A1 * 10/2018 LaChapelle ........... G01S 7/4816
2019/0107606 A1 * 4/2019 Russell .................... G01S 17/26
2019/0235081 A1 * 8/2019 Smits ..................... G01S 17/931
2020/0256964 A1 * 8/2020 Campbell ............. G01S 7/4861
2020/0271788 A1 * 8/2020 Lewis ................... G01S 7/4817
2020/0284883 A1 * 9/2020 Ferreira ................ G01S 7/4815
(Continued)

FOREIGN PATENT DOCUMENTS

CN 110462424 A * 11/2019 ............ H10W 90/00
CN 118897294 A * 11/2024 ............ B60W 60/00
(Continued)

*Primary Examiner* — Atul Trivedi
(74) *Attorney, Agent, or Firm* — Birch, Stewart, Kolasch & Birch, LLP

(57) ABSTRACT

Disclosed herein are systems, methods, and computer program products for operating a lidar system (LS). The methods comprise: receiving result values (RVs) from photodetectors (the RVs based on operations performed by each photodetector to facilitate measurements associated with a light signal reflected off an object external to LS); combining different sets of RVs to generate super pixels; using super pixels to obtain spatiotemporal coherence metrics; selecting a subset of light pulses or a group of RVs based on the spatiotemporal coherence metrics; and detecting a distance between LS and object based on the selected subset of light pulses or the selected group of RVs. The methods enable variable resolution imaging systems in which the resolution of the pixel can be configured to automatically integrate a variable number of spatial and temporal measurements that belong to the same object to improve detection quality rather than using a fixed number of measurements.

20 Claims, 15 Drawing Sheets

(56) References Cited

U.S. PATENT DOCUMENTS

| | | | | |
|---|---|---|---|---|
| 2020/0300990 | A1* | 9/2020 | Eichenholz | G01S 7/4865 |
| 2021/0082148 | A1* | 3/2021 | Parkison | G01S 7/40 |
| 2021/0165094 | A1* | 6/2021 | Droz | G01S 17/10 |
| 2021/0311171 | A1 | 10/2021 | Richards et al. | |
| 2021/0356601 | A1* | 11/2021 | Burbank | G01S 7/484 |
| 2021/0394781 | A1* | 12/2021 | Li | B60W 30/09 |
| 2021/0396887 | A1* | 12/2021 | Schmalenberg | G01S 17/86 |
| 2022/0043127 | A1* | 2/2022 | LaChapelle | G01S 7/484 |
| 2022/0099814 | A1* | 3/2022 | Finkelstein | G01S 7/4815 |
| 2022/0118555 | A1* | 4/2022 | Sibley | B05B 15/68 |
| 2022/0137218 | A1* | 5/2022 | Onal | G01N 21/359 356/4.01 |
| 2022/0179071 | A1* | 6/2022 | Pacala | G01S 7/4816 |
| 2022/0236417 | A1* | 7/2022 | LaChapelle | G01S 7/4815 |
| 2022/0317267 | A1* | 10/2022 | Voicu | G01S 7/4865 |
| 2022/0329847 | A1* | 10/2022 | Parashar | G06T 7/11 |
| 2022/0381913 | A1* | 12/2022 | Joba | G01S 17/931 |
| 2023/0008801 | A1 | 1/2023 | Klemme et al. | |
| 2023/0046274 | A1* | 2/2023 | Chen | G01S 13/931 |
| 2023/0134302 | A1* | 5/2023 | Herman | G06V 10/147 382/104 |
| 2023/0148066 | A1* | 5/2023 | Benscoter | G01S 17/10 356/4.01 |
| 2023/0341556 | A1* | 10/2023 | Fujisawa | G01S 17/931 |
| 2023/0366993 | A1* | 11/2023 | Sun | G01S 17/931 |
| 2023/0375714 | A1* | 11/2023 | Lin | G01S 17/931 |
| 2023/0400589 | A1* | 12/2023 | Lin | G01S 17/931 |
| 2024/0069167 | A1 | 2/2024 | Song | |
| 2024/0201337 | A1* | 6/2024 | Smith | G01S 17/10 |
| 2024/0264290 | A1* | 8/2024 | Payne | G01S 17/32 |
| 2024/0310495 | A1* | 9/2024 | Zhu | G01S 17/89 |
| 2024/0310851 | A1* | 9/2024 | Ebrahimi Afrouzi | G01S 17/87 |
| 2025/0076509 | A1* | 3/2025 | Terefe | B60W 50/029 |
| 2025/0085409 | A1* | 3/2025 | Voicu | G01S 17/42 |
| 2025/0199158 | A1* | 6/2025 | Eichenholz | G01S 13/865 |
| 2025/0208273 | A1* | 6/2025 | Andani | G01S 7/4817 |
| 2025/0277895 | A1* | 9/2025 | Michaels | G01S 17/06 |
| 2025/0283985 | A1* | 9/2025 | Mehrotra | G01S 7/4802 |
| 2025/0298126 | A1* | 9/2025 | Mehrotra | G01S 17/42 |
| 2025/0334697 | A1* | 10/2025 | Griffis | G01S 7/4861 |

FOREIGN PATENT DOCUMENTS

| | | | | | |
|---|---|---|---|---|---|
| CN | 119096163 | A | * | 12/2024 | G01S 7/4868 |
| CN | 119667643 | A | * | 3/2025 | |
| CN | 120051708 | A | * | 5/2025 | G01S 7/4865 |
| KR | 102472631 | B1 | * | 11/2022 | G08G 1/166 |
| SE | 2430658 | A1 | * | 1/2026 | H04N 13/239 |
| WO | WO-2020223561 | A1 | * | 11/2020 | G01S 7/4865 |
| WO | WO-2021065500 | A1 | * | 4/2021 | G01C 3/06 |
| WO | WO-2021127403 | A1 | * | 6/2021 | G09G 3/3426 |
| WO | WO-2022107512 | A1 | * | 5/2022 | H10D 84/811 |
| WO | WO-2023098988 | A1 | * | 6/2023 | G01S 17/42 |
| WO | WO-2023235873 | A1 | * | 12/2023 | G01S 17/34 |
| WO | WO-2024039237 | A1 | * | 2/2024 | G01S 7/4865 |
| WO | WO-2024081594 | A1 | * | 4/2024 | G01S 7/4868 |
| WO | WO-2024112858 | A2 | * | 5/2024 | G01S 17/26 |
| WO | WO-2024167751 | A1 | * | 8/2024 | G01S 17/89 |
| WO | WO-2025212138 | A1 | * | 10/2025 | G01S 17/931 |
| WO | WO-2026001925 | A1 | * | 1/2026 | G01S 7/4865 |

* cited by examiner

| $p_1$ | $p_2$ | $p_3$ | $p_4$ | $p_5$ | $p_6$ | $p_7$ | $p_8$ | $p_9$ | $p_{10}$ | $p_{11}$ | $p_{12}$ |
|---|---|---|---|---|---|---|---|---|---|---|---|
| $p_{13}$ | $p_{14}$ | $p_{15}$ | $p_{16}$ | $p_{17}$ | $p_{18}$ | $p_{19}$ | $p_{20}$ | $p_{21}$ | $p_{22}$ | $p_{23}$ | $p_{24}$ |
| $p_{25}$ | $p_{26}$ | $p_{27}$ | $p_{28}$ | $p_{29}$ | $p_{30}$ | $p_{31}$ | $p_{32}$ | $p_{33}$ | $p_{34}$ | $p_{35}$ | $p_{36}$ |
| $p_{37}$ | $p_{38}$ | $p_{39}$ | $p_{40}$ | $p_{41}$ | $p_{42}$ | $p_{43}$ | $p_{44}$ | $p_{45}$ | $p_{46}$ | $p_{47}$ | $p_{48}$ |
| $p_{49}$ | $p_{50}$ | $p_{51}$ | $p_{52}$ | $p_{53}$ | $p_{54}$ | $p_{55}$ | $p_{56}$ | $p_{57}$ | $p_{58}$ | $p_{59}$ | $p_{60}$ |
| $p_{61}$ | $p_{62}$ | $p_{63}$ | $p_{64}$ | $p_{65}$ | $p_{66}$ | $p_{67}$ | $p_{68}$ | $p_{69}$ | $p_{70}$ | $p_{71}$ | $p_{72}$ |
| $p_{73}$ | $p_{74}$ | $p_{75}$ | $p_{76}$ | $p_{77}$ | $p_{78}$ | $p_{79}$ | $p_{80}$ | $p_{81}$ | $p_{82}$ | $p_{83}$ | $p_{84}$ |
| $p_{85}$ | $p_{86}$ | $p_{87}$ | $p_{88}$ | $p_{89}$ | $p_{90}$ | $p_{91}$ | $p_{92}$ | $p_{93}$ | $p_{94}$ | $p_{95}$ | $p_{96}$ |
| $p_{97}$ | $p_{98}$ | $p_{99}$ | $p_{100}$ | $p_{101}$ | $p_{102}$ | $p_{103}$ | $p_{104}$ | $p_{105}$ | $p_{106}$ | $p_{107}$ | $p_{108}$ |
| $p_{109}$ | $p_{110}$ | $p_{111}$ | $p_{112}$ | $p_{113}$ | $p_{114}$ | $p_{115}$ | $p_{116}$ | $p_{117}$ | $p_{118}$ | $p_{119}$ | $p_{120}$ |
| $p_{121}$ | $p_{122}$ | $p_{123}$ | $p_{124}$ | $p_{125}$ | $p_{126}$ | $p_{127}$ | $p_{128}$ | $p_{129}$ | $p_{130}$ | $p_{131}$ | $p_{132}$ |
| $p_{133}$ | $p_{134}$ | $p_{135}$ | $p_{136}$ | $p_{137}$ | $p_{138}$ | $p_{139}$ | $p_{140}$ | $p_{141}$ | $p_{142}$ | $p_{143}$ | $p_{144}$ |

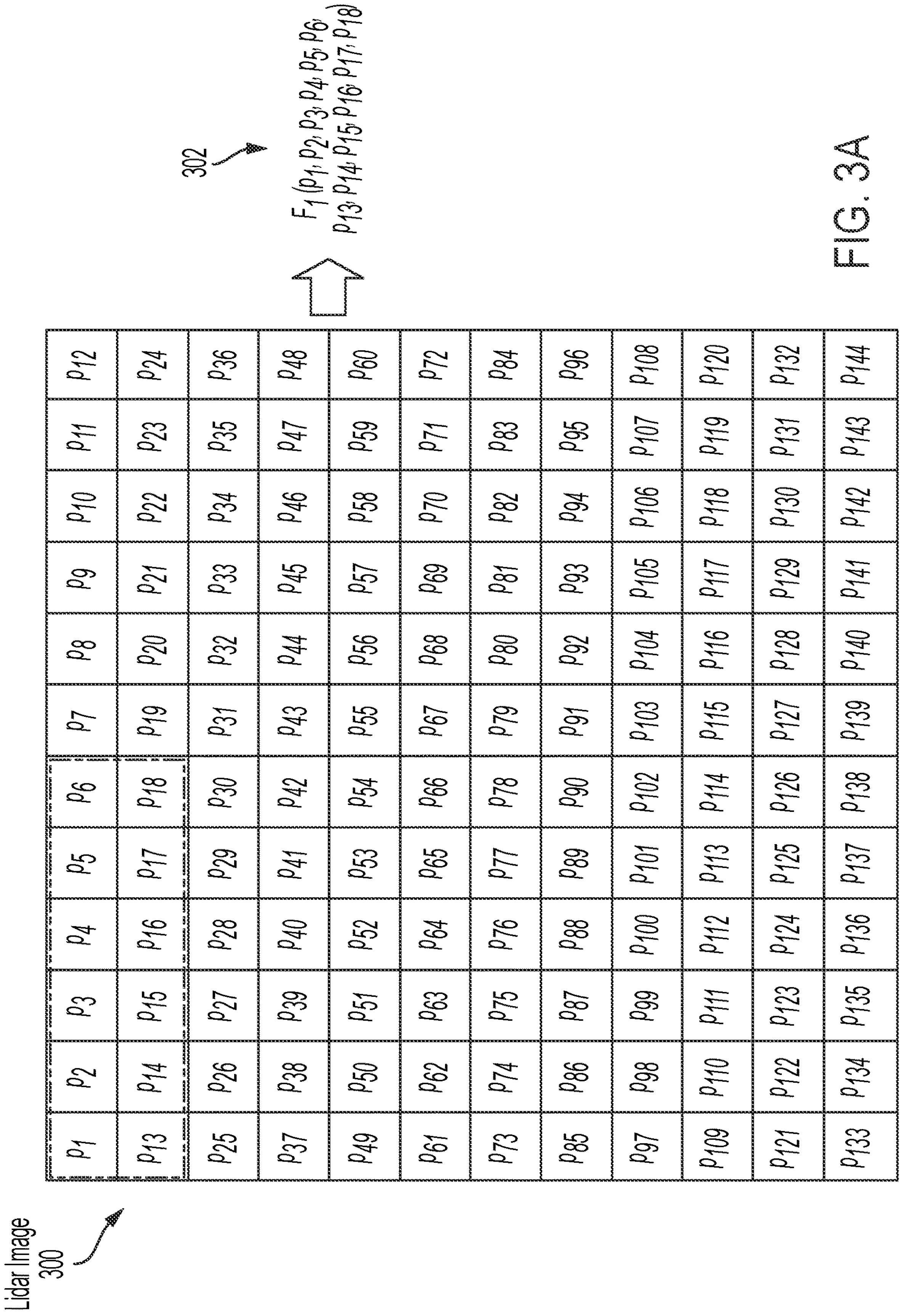

FIG. 3A

| | | | | | | | | | | | |
|---|---|---|---|---|---|---|---|---|---|---|---|
| $p_1$ | $p_2$ | $p_3$ | $p_4$ | $p_5$ | $p_6$ | $p_7$ | $p_8$ | $p_9$ | $p_{10}$ | $p_{11}$ | $p_{12}$ |
| $p_{13}$ | $p_{14}$ | $p_{15}$ | $p_{16}$ | $p_{17}$ | $p_{18}$ | $p_{19}$ | $p_{20}$ | $p_{21}$ | $p_{22}$ | $p_{23}$ | $p_{24}$ |
| $p_{25}$ | $p_{26}$ | $p_{27}$ | $p_{28}$ | $p_{29}$ | $p_{30}$ | $p_{31}$ | $p_{32}$ | $p_{33}$ | $p_{34}$ | $p_{35}$ | $p_{36}$ |
| $p_{37}$ | $p_{38}$ | $p_{39}$ | $p_{40}$ | $p_{41}$ | $p_{42}$ | $p_{43}$ | $p_{44}$ | $p_{45}$ | $p_{46}$ | $p_{47}$ | $p_{48}$ |
| $p_{49}$ | $p_{50}$ | $p_{51}$ | $p_{52}$ | $p_{53}$ | $p_{54}$ | $p_{55}$ | $p_{56}$ | $p_{57}$ | $p_{58}$ | $p_{59}$ | $p_{60}$ |
| $p_{61}$ | $p_{62}$ | $p_{63}$ | $p_{64}$ | $p_{65}$ | $p_{66}$ | $p_{67}$ | $p_{68}$ | $p_{69}$ | $p_{70}$ | $p_{71}$ | $p_{72}$ |
| $p_{73}$ | $p_{74}$ | $p_{75}$ | $p_{76}$ | $p_{77}$ | $p_{78}$ | $p_{79}$ | $p_{80}$ | $p_{81}$ | $p_{82}$ | $p_{83}$ | $p_{84}$ |
| $p_{85}$ | $p_{86}$ | $p_{87}$ | $p_{88}$ | $p_{89}$ | $p_{90}$ | $p_{91}$ | $p_{92}$ | $p_{93}$ | $p_{94}$ | $p_{95}$ | $p_{96}$ |
| $p_{97}$ | $p_{98}$ | $p_{99}$ | $p_{100}$ | $p_{101}$ | $p_{102}$ | $p_{103}$ | $p_{104}$ | $p_{105}$ | $p_{106}$ | $p_{107}$ | $p_{108}$ |
| $p_{109}$ | $p_{110}$ | $p_{111}$ | $p_{112}$ | $p_{113}$ | $p_{114}$ | $p_{115}$ | $p_{116}$ | $p_{117}$ | $p_{118}$ | $p_{119}$ | $p_{120}$ |
| $p_{121}$ | $p_{122}$ | $p_{123}$ | $p_{124}$ | $p_{125}$ | $p_{126}$ | $p_{127}$ | $p_{128}$ | $p_{129}$ | $p_{130}$ | $p_{131}$ | $p_{132}$ |
| $p_{133}$ | $p_{134}$ | $p_{135}$ | $p_{136}$ | $p_{137}$ | $p_{138}$ | $p_{139}$ | $p_{140}$ | $p_{141}$ | $p_{142}$ | $p_{143}$ | $p_{144}$ |

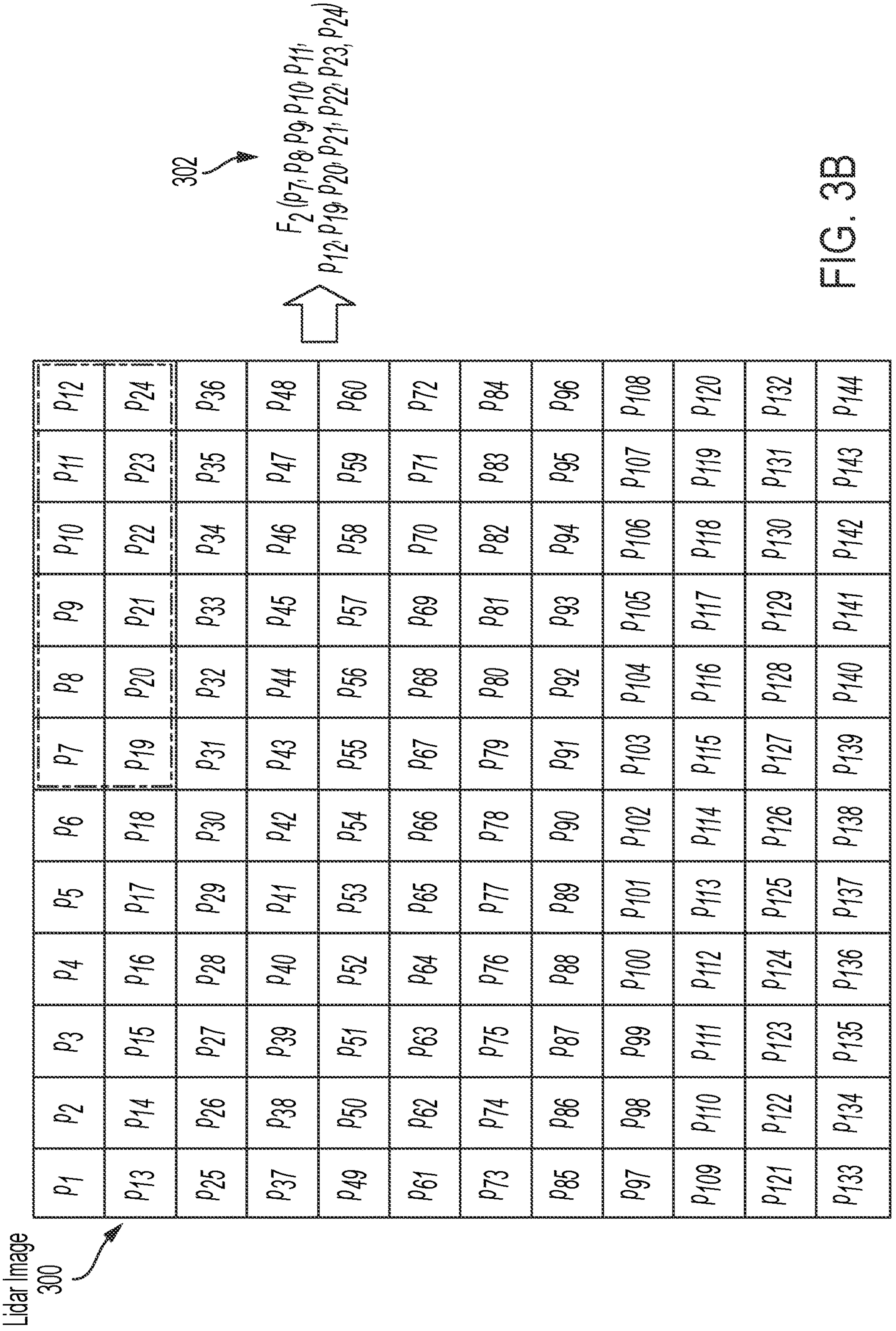

FIG. 3B

| $p_1$ | $p_2$ | $p_3$ | $p_4$ | $p_5$ | $p_6$ | $p_7$ | $p_8$ | $p_9$ | $p_{10}$ | $p_{11}$ | $p_{12}$ |
|---|---|---|---|---|---|---|---|---|---|---|---|
| $p_{13}$ | $p_{14}$ | $p_{15}$ | $p_{16}$ | $p_{17}$ | $p_{18}$ | $p_{19}$ | $p_{20}$ | $p_{21}$ | $p_{22}$ | $p_{23}$ | $p_{24}$ |
| $p_{25}$ | $p_{26}$ | $p_{27}$ | $p_{28}$ | $p_{29}$ | $p_{30}$ | $p_{31}$ | $p_{32}$ | $p_{33}$ | $p_{34}$ | $p_{35}$ | $p_{36}$ |
| $p_{37}$ | $p_{38}$ | $p_{39}$ | $p_{40}$ | $p_{41}$ | $p_{42}$ | $p_{43}$ | $p_{44}$ | $p_{45}$ | $p_{46}$ | $p_{47}$ | $p_{48}$ |
| $p_{49}$ | $p_{50}$ | $p_{51}$ | $p_{52}$ | $p_{53}$ | $p_{54}$ | $p_{55}$ | $p_{56}$ | $p_{57}$ | $p_{58}$ | $p_{59}$ | $p_{60}$ |
| $p_{61}$ | $p_{62}$ | $p_{63}$ | $p_{64}$ | $p_{65}$ | $p_{66}$ | $p_{67}$ | $p_{68}$ | $p_{69}$ | $p_{70}$ | $p_{71}$ | $p_{72}$ |
| $p_{73}$ | $p_{74}$ | $p_{75}$ | $p_{76}$ | $p_{77}$ | $p_{78}$ | $p_{79}$ | $p_{80}$ | $p_{81}$ | $p_{82}$ | $p_{83}$ | $p_{84}$ |
| $p_{85}$ | $p_{86}$ | $p_{87}$ | $p_{88}$ | $p_{89}$ | $p_{90}$ | $p_{91}$ | $p_{92}$ | $p_{93}$ | $p_{94}$ | $p_{95}$ | $p_{96}$ |
| $p_{97}$ | $p_{98}$ | $p_{99}$ | $p_{100}$ | $p_{101}$ | $p_{102}$ | $p_{103}$ | $p_{104}$ | $p_{105}$ | $p_{106}$ | $p_{107}$ | $p_{108}$ |
| $p_{109}$ | $p_{110}$ | $p_{111}$ | $p_{112}$ | $p_{113}$ | $p_{114}$ | $p_{115}$ | $p_{116}$ | $p_{117}$ | $p_{118}$ | $p_{119}$ | $p_{120}$ |
| $p_{121}$ | $p_{122}$ | $p_{123}$ | $p_{124}$ | $p_{125}$ | $p_{126}$ | $p_{127}$ | $p_{128}$ | $p_{129}$ | $p_{130}$ | $p_{131}$ | $p_{132}$ |
| $p_{133}$ | $p_{134}$ | $p_{135}$ | $p_{136}$ | $p_{137}$ | $p_{138}$ | $p_{139}$ | $p_{140}$ | $p_{141}$ | $p_{142}$ | $p_{143}$ | $p_{144}$ |

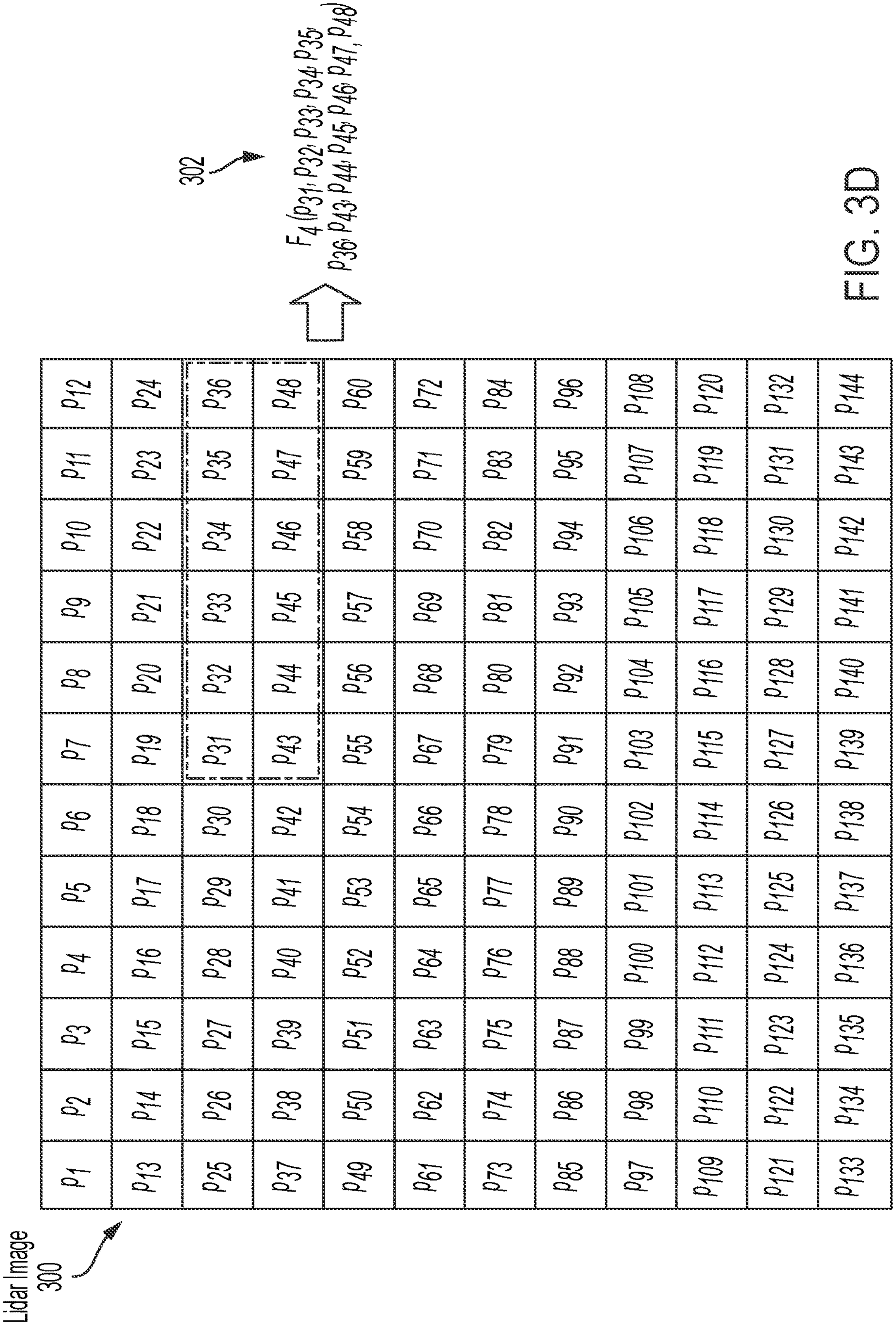

FIG. 3D

FIG. 5
500
Begin
502
Emit a light pulse from a Geiger mode lidar system
504
Receive, at photodetectors, light reflected back into the Geiger mode lidar system
506
Generate timestamps indicating times when the photodetectors detect photons at or near a target wavelength
508
Generate super pixels by combining sets of timestamps
510
Repeat operations 504-510 any number of times
512
Obtain spatiotemporal coherence metrics using the super pixels
514
Select a subset of light pulses or a group of pixels based on the spatiotemporal coherence metrics
516
Optionally assign the timestamps associated with the selected light pulses/pixels to bins
518
Optionally build a histogram
520
Optionally identify the peak of the histogram
522
Optionally map the time associated with the peak to a distance between the lidar system and a target object
524
Optionally cause the peak value and/or distance to be used to generate a map, control operations of vehicle and/or dispatch personnel
526
End or perform other operations
530

SYSTEMS AND METHODS FOR VARIABLE-RESOLUTION REFINEMENT OF GEIGER MODE LIDAR

BACKGROUND

Light detecting and ranging (lidar) systems are used in various applications. One application for lidar systems is autonomous vehicles (AVs). AVs may use lidar systems to measure the distance from the AV to surrounding objects. To accomplish this task, the lidar system illuminates an object with light and measures the reflected light with a sensor. The reflected light is used to determine features of the object that reflected it and to determine the distance the object is from the AV. Lidar systems also may be used in other applications, such as in aircraft, ships and/or mapping systems.

Lidar systems, employing a fixed resolution grid, integrate a fixed number of pulses or detector readings to form a super pixel. However, if the object is not large enough to fill the field of view of the super pixel, then integrating pulses or detector readings that were not reflected from the object would degrade the quality of the estimated point cloud.

SUMMARY

The present disclosure concerns implementing systems and methods for operating a lidar system. The methods comprise: performing operations by each photodetector to facilitate measurements associated with a light signal reflected off an object external to the lidar system; receiving, by a processor, result values from the photodetectors that indicate times when the photodetectors detect photons at or near a target wavelength; combining, by the processor, different sets of the result values to generate a plurality of super pixels; using, by the processor, the plurality of super pixels to obtain spatiotemporal coherence metrics; selecting, by the processor, a subset of light pulses or a group of results values based on the spatiotemporal coherence metrics; and/or detecting, by the processor, a distance between the lidar system and the object based on the selected subset of light pulses or the selected group of results values.

The implementing systems can comprise: a processor; and a non-transitory computer-readable storage medium comprising programming instructions that are configured to cause the processor to implement a method for operating a lidar system. The above-described methods can also be implemented by a computer program product comprising memory and programming instructions that are configured to cause a processor to perform operations.

BRIEF DESCRIPTION OF THE DRAWINGS

The accompanying drawings are incorporated herein and form a part of the specification.

FIGS. 3A-3E (collectively referred to as "FIG. 3") provide illustrations showing a convolutional oversampling technique for combining non-overlapping sets of results from photodetectors of the lidar system shown in FIG. 1. The combination is done by functions F1 through F5.

In the drawings, like reference numbers generally indicate identical or similar elements. Additionally, generally, the leftmost digit(s) of a reference number identifies the drawing in which the reference number first appears.

DETAILED DESCRIPTION

Figure 1:
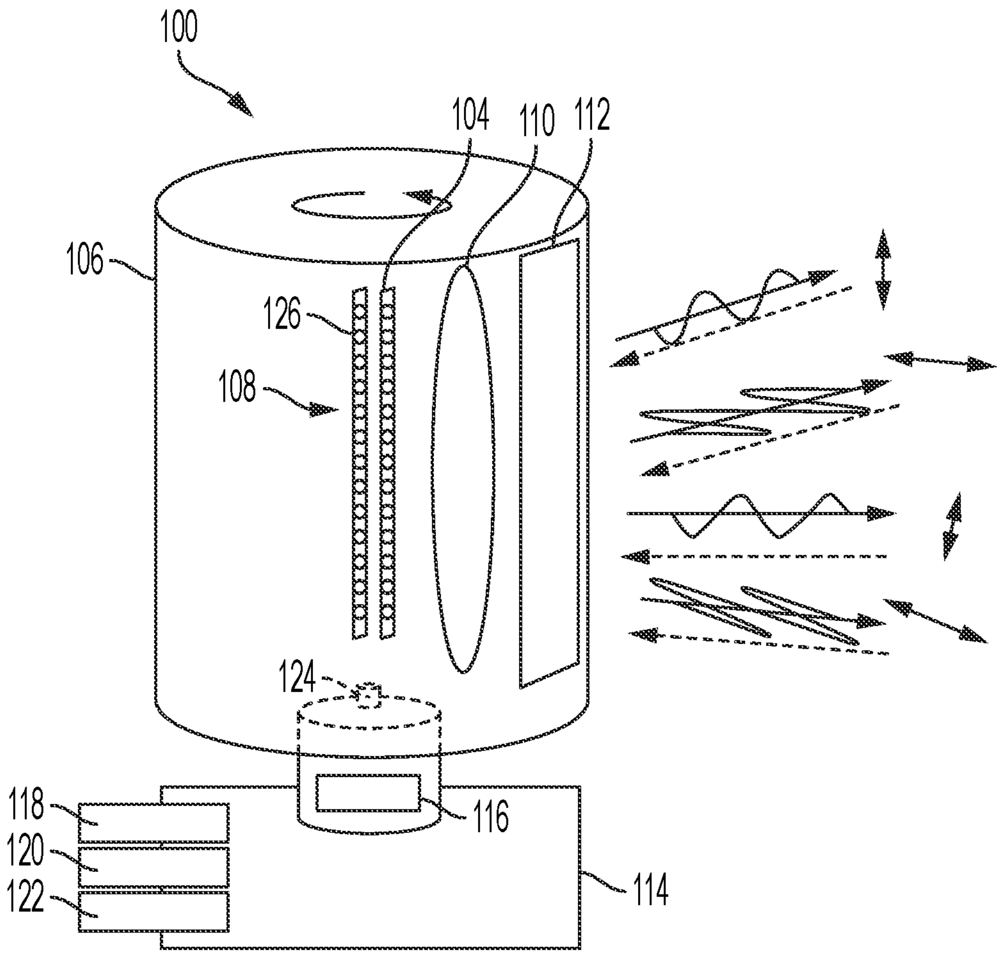
FIG. 1 is an illustration of a lidar system.

Lidar systems may have a fixed resolution. The resolution is defined as a property of the hardware and software system and is independent of the reflectivity performance of the lidar systems. In practice, this means that for a given target of a fixed size, the lidar system has some probability of detection that is a function of reflectivity and range, and a fixed resolution. However, this is not necessarily what is desirable in downstream computer vision pipelines. Such pipelines might prefer to have a constant probability of detection over a given range and be willing to sacrifice other properties of the range sensing system (such as resolution) to obtain it. For example, having a constant (high) probability of detection but fewer points on target for lower reflectivity objects would permit a perception system to be confident that an object is present even if it is low reflectivity, potentially at the cost of worse velocity estimation or poorer data association.

This document describes system, apparatus, device, method and/or computer program product embodiments, and/or combinations and sub-combinations of any of the above, for variable-resolution refinement of Geiger mode lidar resolution to address the probability of detection issue with conventional lidar systems. This feature of the present solution provides for improved lidar system operations, object detections using lidar data, and/or vehicle control.

The methods generally involve: performing operations by each photodetector to facilitate measurements associated with a light signal reflected off an object external to the lidar system; receiving, by a processor, result values from the photodetectors that indicate times when the photodetectors detect photons at or near a target wavelength; combining, by the processor, different sets of the result values to generate a plurality of super pixels; using, by the processor, the plurality of super pixels to obtain spatiotemporal coherence metrics; selecting, by the processor, a subset of light pulses or a group of results values based on the spatiotemporal coherence metrics; detecting, by the processor, a distance between the lidar system and the object based on the selected subset of light pulses or the selected group of results values; and/or causing, by the processor, the distance to be used to control operations of a vehicle.

The spatiotemporal coherence metrics may be obtained by considering the super pixels for a fixed or variable number of pulses of the light signal. In both cases, the spatiotemporal coherence metrics can include, but are not limited to, distribution comparison metrics, time of flight statistic metrics, and/or detection confidence scores. In the distribution comparison metric scenario, the spatiotemporal coherence metrics may comprise metrics that each specify a change in distribution between detections of two pulses or two groups of pulses by the plurality of photodetectors. The subset of light pulses or the group of result values is selected based on a greatest one of the metrics. In the time of flight statistic metric scenario, the spatiotemporal coherence metrics may comprise a measured variance for each pulse of differences between consecutive timestamps that have been sorted from lowest value to highest value or highest value to lowest value. The subset of light pulses or the group of result values which is selected comprises light pulses or result values that are associated with relatively low measured variances. In the detection confidence score scenario, the spatiotemporal coherence metrics may comprise a score for each pulse of the light signal that indicates a confidence or validity of an object detection. A pulse is selected for inclusion in the subset when the score exceeds a value. Similarly, result values may be selected for inclusion in the group when the score associated with a respective pulse exceeds a value.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to."

In this document, the term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

Definitions for additional terms that are relevant to this document are included at the end of this Detailed Description.

FIG. 1 illustrates an architecture for a lidar system 100, in accordance with aspects of the disclosure. Lidar system 100 is merely an example lidar system and that other lidar systems are further contemplated in accordance with aspects of the present disclosure, as should be understood by those of ordinary skill in the art.

As shown in FIG. 1, the lidar system 100 includes a housing 106 which may be rotatable 360° about a central axis such as hub or axle 124 of a motor 116. The housing 106 may include an emitter/receiver aperture 112 made of a material transparent to light. Although a single aperture is shown in FIG. 1, the present solution is not limited in this regard. In other scenarios, multiple apertures for emitting and/or receiving light may be provided. Either way, the lidar system 100 can emit light through one or more of the apertures 112 and receive reflected light back toward one or more of the apertures 112 as the housing 106 rotates around the internal components. In alternative scenarios, the outer shell of housing 106 may be a stationary dome, at least partially made of a material that is transparent to light, with rotatable components inside of the housing 106.

Inside the rotating shell or stationary dome is a light emitter system 104 that is configured and positioned to generate and emit pulses of light through the aperture 112 or through the transparent dome of the housing 106 via one or more laser emitter chips or other light emitting devices. The emitter system 104 may include any number of individual emitters (for example, 8 emitters, 64 emitters, or 128 emitters). The emitters may emit light of substantially the same intensity or of varying intensities. The lidar system 100 also includes a light detector 108 containing an array of photodetectors 126. The photodetectors 126 are positioned and configured to receive light reflected back into the system. Upon receiving reflected light, the photodetectors 126 produce results (or electrical pulses) indicating measured intensities of the light signal reflected off an object external to the lidar system. In Geiger mode applications, the photodetectors 126 fire when a single photon at or near a target wavelength is detected thereby. The times of the photodetector firings are recorded as timestamps. The light emitter system 104 and light detector 108 rotate with the rotating shell, or they rotate inside the stationary dome of the housing 106. One or more optical element structures 110 may be positioned in front of the light emitting system 104 and/or the light detector 108 to serve as one or more lenses or wave plates that focus and direct light that is passed through the optical element structure 110.

One or more optical element structures 110 may be positioned in front of a mirror (not shown) to focus and direct light that is passed through the optical element structure. As shown in FIG. 1, a single optical element structure 310 is positioned in front of the mirror and connected to the rotating elements of the system so that the optical element structure 110 rotates with the mirror. Alternatively or additionally, the optical element structure 110 may include multiple such structures (for example, lenses and/or waveplates). Optionally, multiple optical element structures 110 may be arranged in an array on or integral with the shell portion of the housing 106.

The lidar system 100 includes a power unit 118 to power the light emitting system 104, motor 116, and electronic components. The lidar system 100 also includes an analyzer 114 with elements such as a processor 122 and non-transitory computer-readable memory 120 containing programming instructions. The programming instructions are configured to enable the system to receive data collected by the light detector 108, analyze the received data to measure characteristics of the light received, and generate information that a connected system can use to make decisions about operating in an environment from which the data was collected. Optionally, the analyzer 114 may be integral with the lidar system 100 as shown, or some or all of it may be external to the lidar system and communicatively connected to the lidar system via a wired or wireless communication network or link.

In the Geiger mode lidar system scenarios, the photodetectors 126 fire when a single photon at or near the target wavelength is detected. The times of the photodetector firings (and the associated illuminator firing) is accumulated into a histogram. Peak finding operations are then run on this histogram to obtain the depth of the object reflecting the photons at the target wavelength for the region of space covered by the photodetector(s). That is: a series of individual returns from laser firings are obtained across some field of view; and an aggregation and peak finding algorithm is used to determine a depth of a target object as a function of (at least, other signals may be included) time of flight of photons observed.

In conventional systems, there is nothing forcing the Geiger mode lidar system to use the same number of laser firings per pixel to recover the peak of the histogram. Indeed, the physical consequence of continuing to accumulate laser firings is purely that the frustum described by the rotating sensor expands along the axis in question as it continues to do so (that is, the system increases the odds that it merges returns from more than one surface). Moreover, there is nothing stopping the system from consolidating the returns of adjacent photodetectors—again, this just adjusts the frustum imaged by a particular lidar point. In truth, in any gapless sensor, each point is actually the average depth of the closest-along-the-ray surface images for each ray of some frustum. Putting these insights together, the conventional Geiger mode lidar system is modified in accordance with the present solution to use a variable size aggregation window as a function of reflectivity or a proxy thereof (such as return count, return noise, observations from a correlated other sensor system such as a camera, etc.).

The lidar system 100 uses results output from the photodetectors 126 to produce measured 3D points by aggregating results from the photodetector(s). A single photodetector is not typically sufficient to produce a depth measurement, so instead results from a plurality of photodetectors are combined in super pixels. One illustrative technique for generating the super-pixels is shown in FIG. 2.

Figure 2:
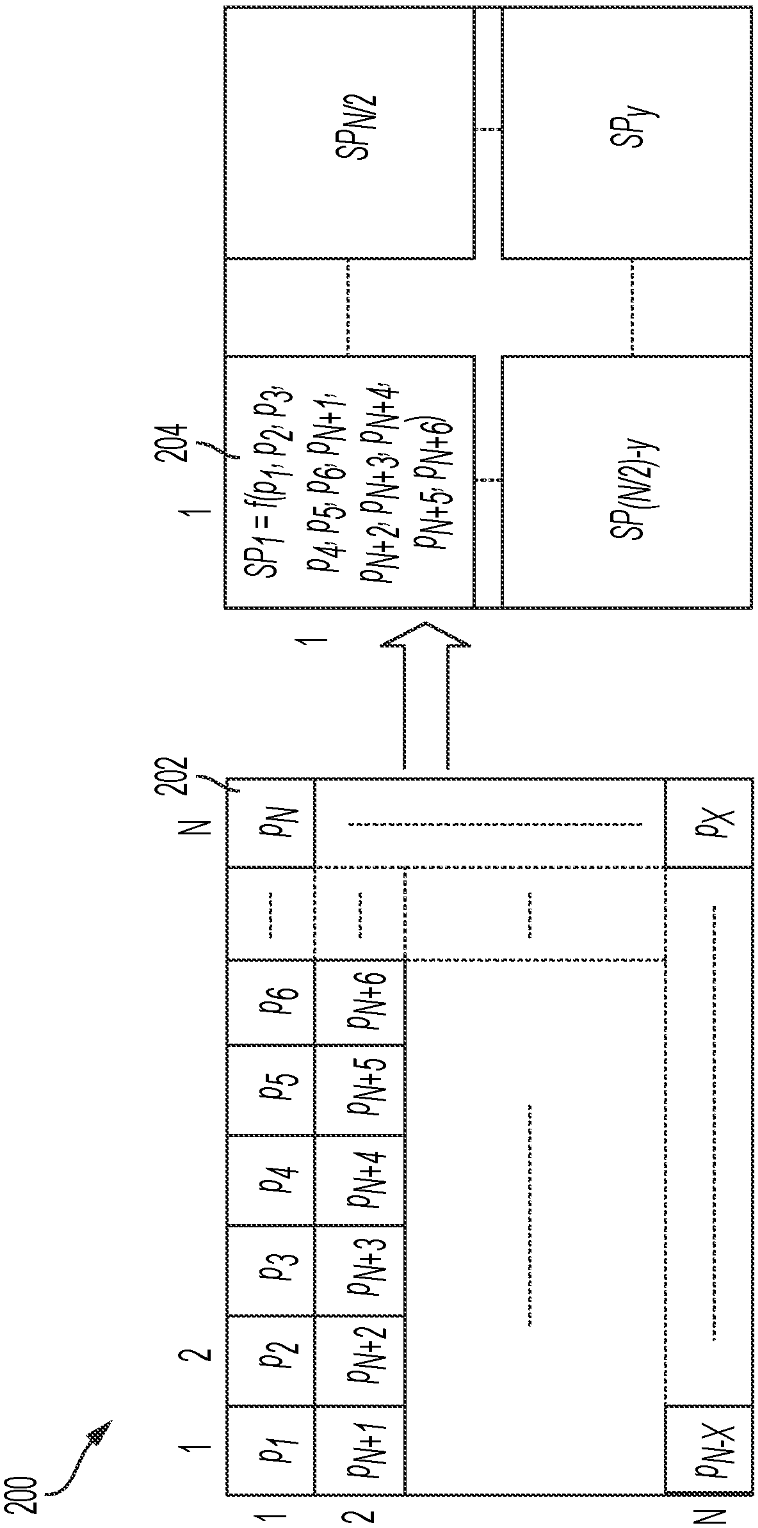
FIG. 2 is an illustration of a technique for combining results from photodetectors of the lidar system shown in FIG. 1.

In FIG. 2, a photodetector array comprises photodetectors arranged in a grid pattern. Results $p_1, p_2, \ldots, p_X$ from the photodetectors may be represented in grid 200 defined by a plurality of cells, where each cell 202 is associated with a respective one of the photodetectors and x is an integer equal to the total number of photodetectors in the array. The cells 202 of the grid 200 can be arranged in the same pattern as the photodetectors, for example, a 256×256 grid pattern. Each result is also referred to herein as a pixel of a lidar image. The pixels $p_1, p_2, \ldots, p_X$ from the photodetectors may be naively aggregated in a super cell-by-super cell manner to produce a set of 3D points. A super cell has a size of W×W, where W is an integer. In FIG. 2, each super cell is 2 cell×6 cells. The 3D point associated with each super cell 204 is derived by combining the respective six pixels with each other to obtain a super pixel $SP_1, SP_2, \ldots, SP_y$. A first super pixel $SP_1$ may be defined by the following mathematical equation.

$$SP_1 = f(p_1, p_2, p_3, p_4, p_5, p_6, p_{N+l}, p_{N+2}, p_{N+3}, p_{N+4}, p_{N+5}, p_{N+6})$$

The other super pixels $SP_2, \ldots, SP_y$ would be defined by a similar mathematical equation as should be understood. The mechanism by which the pixels are aggregated is specific to individual lidar system designed and may vary in accordance with applications. For example, simple addition or a convolutional approach may be employed for pixel aggregation.

Figure 3C:
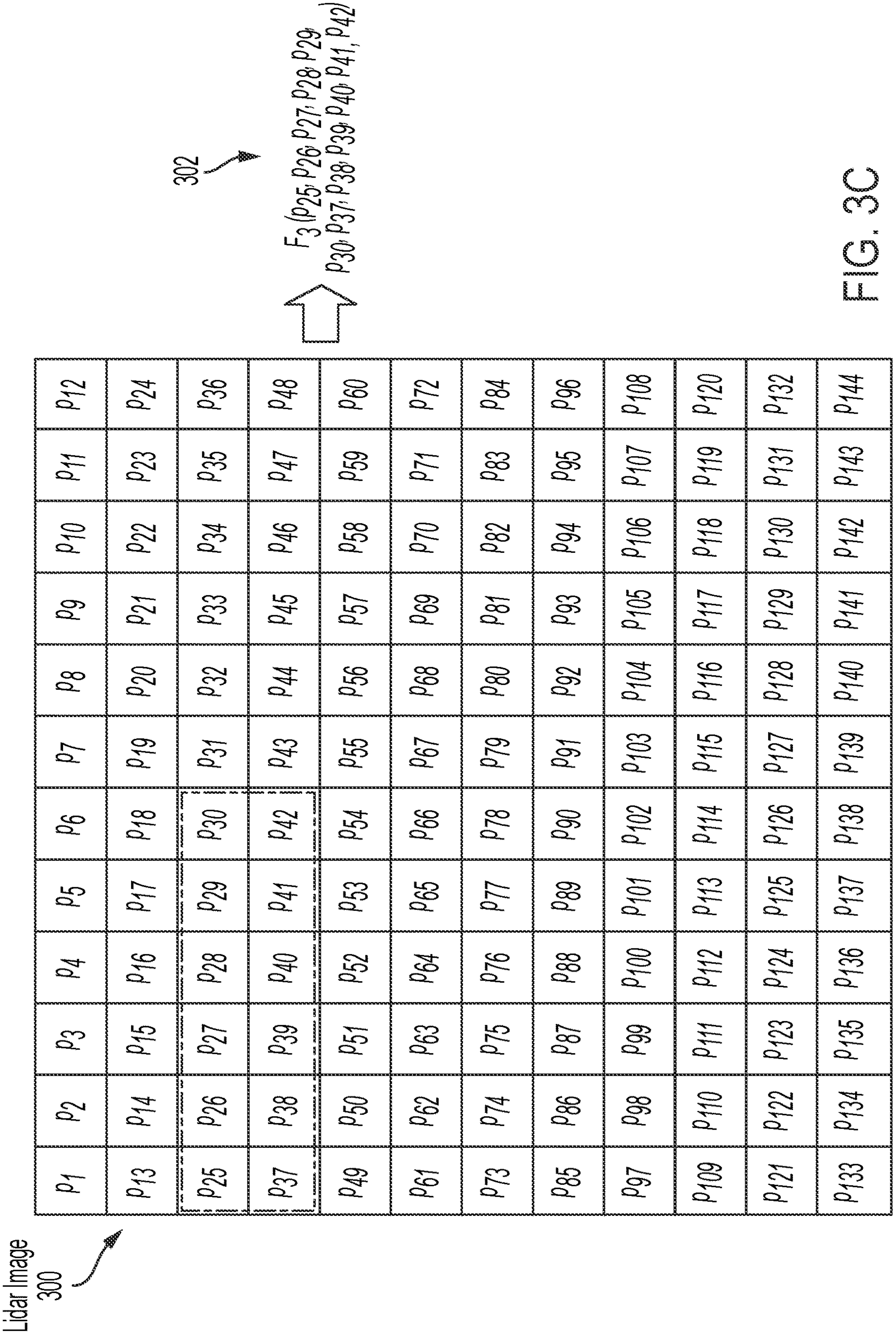

An illustration is provided in FIG. 3 that is useful for understanding a convolutional approach. The convolutional approach can employ at least one convolution filter (or kernel) 302 that runs over a lidar image 300 and computes features $F_1, F_2, F_3, F_4, \ldots, F_{12}$. In the event that multiple computing kernels are employed, each computing kernel extracts a different feature from the lidar image. The computing kernel has a size of 2×6. The image has a size of 12×12. The stride is 6. Thus, the features generated by the computing kernel 302 are defined by the following mathematical equations (1)-(4).

$$F_1 = f(p_1, p_2, p_3, p_4, p_5, p_6, p_{13}, p_{14}, p_{15}, p_{16}, p_{17}, p_{18}) \quad (1)$$

$$F_2 = f(p_7, p_8, p_9, p_{10}, p_{11}, p_{12}, p_{19}, p_{20}, p_{21}, p_{22}, p_{23}, p_{24}) \quad (2)$$

$$F_3 = f(p_{25}, p_{26}, p_{27}, p_{28}, p_{29}, p_{30}, p_{37}, p_{38}, p_{39}, p_{40}, p_{41}, p_{42}) \quad (3)$$

$$F_4 = f(p_{31}, p_{32}, p_{33}, p_{34}, p_{35}, p_{36}, p_{43}, p_{44}, p_{45}, p_{46}, p_{47}, p_{48}) \quad (4)$$

$$\ldots$$

Figure 3E:
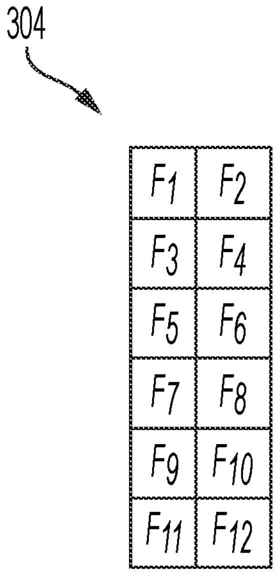

$F_1$, $F_2$, $F_3$ and $F_4$ represent features generated by the processor (or computing kernel) 302. These features are also referred to herein as super pixels. $p_1, p_2, \ldots, p_{144}$ each represent a result output from a respective photodetector of a lidar system (for example, lidar system 100 of FIG. 1). These results are also referred to as pixels of a lidar image. As evidenced by mathematical equations (1)-(4), the convolutional oversampling operations generally comprise combining pixel values to generate a super pixel. The outputs of the processor (or computing kernel) 302 are arranged in a grid 304 of features (or super pixels) as shown in FIG. 3E. Grid 304 is also referred to herein as a feature image. A feature can include, but is not limited to, depth, intensity, noise, confidence or other features associated with a point cloud. The present solution is not limited to the particulars of FIG. 3. Other convolutional oversampling techniques can be employed.

Lidar system 100 may comprise a Geiger mode lidar system. In the Geiger mode lidar system, the photodetectors fire when a single photon at or near the target wavelength is detected, and the time of their firing (and the associated illuminator firing) is accumulated into a histogram. Peak finding operations are then run on this histogram to obtain the depth of the object reflecting the photons at the target wavelength for the region of space covered by the photodetector. That is: a series of individual returns from laser firings are obtained across some Feld of View (FoV); and an aggregation and peak finding algorithm is used to determine depth as a function of (at least, other signals may be included) Time of Fight (ToF) of photons observed.

There is nothing forcing the lidar system 100 to use the same number of laser firings per pixel to recover the peak of the histogram. Indeed, the physical consequence of continuing to accumulate laser firings is purely that the frustum described by the rotating sensor expands along the axis in question. That is, the odds are increased that returns from more than one surface are merged into super pixels. Moreover, there is nothing stopping the lidar system 100 from consolidating the returns of adjacent photodetectors—again, this just adjusts the frustum imaged by a particular lidar point. In any gapless sensor, each point is actually the average depth of the closest-along-the-ray surface imaged for each ray of some frustum. Putting these insights together, the lidar system 100 is configured to use a variable size aggregation window as a function of reflectivity or a proxy thereof (such as return count, return noise, observations from a correlated other sensor system such as a camera, etc.).

The lidar system 100 is configured to ensure that integrated measurements are obtained from one target or one surface. This is achieved using a spatiotemporal coherency metric that leverages the joint temporal and spatial diversity in range measurements obtained by the lidar system 100. In other words, multiple measurements are obtained in a spatial axis (integrating multiple pixels into a super pixel) and a temporal axis (integrating multiple pulses). If measurements are obtained from the same surface, the statistical characteristics of the measurements should be similar, i.e., coherent in a temporal and spatial domain.

For example, the lidar system comprises 144 photodetectors and a processor configured to combine pixels $p_x$ into super pixels $SP_y$ using a processor (or computing kernel) having a size of 2×6. The following TABLE 1 shows twelve ToF measurements or timestamps that were obtained for five pulses emitted from the lidar system. The example of TABLE 1 is showing a measurement for a single super pixel integrating five pulses and twelve pixel measurements. However, the object is not large enough to span all given pulses. Note that the lidar system here is rotating as pulses are being sent. So as the lidar system rotates, the span of the object across the horizontal direction might be large enough to intercept and reflect all the five pulses.

TABLE 1

| | Super Pixels | | | | | | | | | | | | |
|---|---|---|---|---|---|---|---|---|---|---|---|---|---|
| Pulse | $p_1$ | $p_2$ | $p_3$ | $p_4$ | $p_5$ | $p_6$ | $p_7$ | $p_8$ | $p_9$ | $p_{10}$ | $p_{11}$ | $p_{12}$ | |
| P1 | 684 | 559 | 629 | 192 | 835 | 763 | 707 | 359 | 9 | 723 | 277 | 754 | Noise |
| P2 | 804 | 599 | 70 | 472 | 600 | 396 | 314 | 705 | 486 | 551 | 87 | 174 | Noise |
| P3 | 600 | 849 | 677 | 537 | 845 | 72 | 777 | 916 | 115 | 976 | 755 | 709 | Noise |
| P4 | 100 | 100 | 101 | 100 | 100 | 99 | 97 | 101 | 101 | 99 | 102 | 99 | Target |
| P5 | 100 | 100 | 102 | 101 | 100 | 100 | 99 | 98 | 100 | 100 | 101 | 101 | Target |

Figure 4:
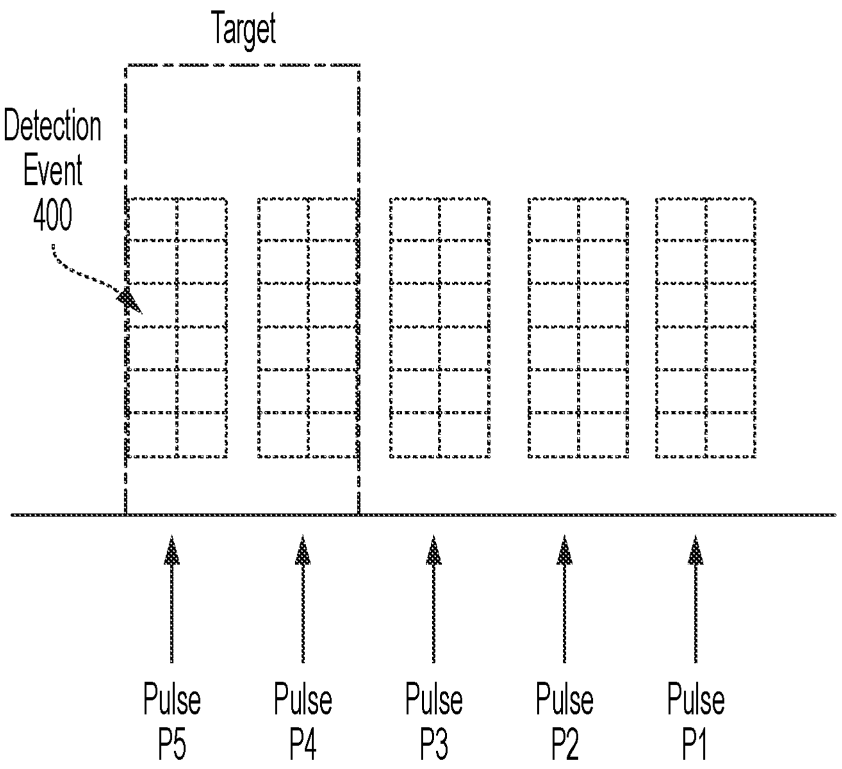
FIG. 4 shows an example of an object that reflects only two out of five pulses P1-P5 being integrated in that example.

In TABLE 1, each cell includes a ToF measurement or timestamp associated with a detection event reported by a super pixel associated with a particular one of the five emitted pulses. As shown in FIG. 4, each super pixel is reporting a single detection event 400 such that there are a total of twelve detection events 400 for each pulse P1, P2, P3, P4, P5. For pulse P1, the timestamps are 684 for pixel $p_1$, 559 for pixel $p_2$, 629 for pixel $p_3$, 192 for pixel $p_4$, 835 for pixel $p_5$, 763 for pixel $p_6$, 707 for pixel $p_7$, 359 for pixel $p_8$, 9 for pixel $p_9$, 723 for pixel $p_{10}$, 277 for pixel $p_{11}$, and 754 for pixel $p_{12}$. The actual scene that was imaged by pulse P1 is noise only (there is no target object in the super pixel field of view) as shown in FIG. 4. Similarly, there are twelve detection timestamps in TABLE 1 and FIG. 4 for each of the other pulses P2, P3, P4, P5. The first three pulses P1, P2, P3 capture noise only measurements (no target in the field of view), while the last two pulses P4, P5 capture target measurements.

In a system with fixed resolution, a fixed number of pulses are integrated. However, if the target object is smaller than the span of integration time, the quality of the overall detection would be deteriorated. In the example provided in above TABLE 1 and FIG. 4, if all the measurements from the five pulses P1, P2, P3, P4, P5 were integrated to estimate the range of the target object, the measurements of the first three pulses P1, P2, P3 would negatively impact the quality of the estimation since they contain no information about the target object's range.

The essence of the present solution is to provide implementing systems and methods for selecting a subset of light pulses for which photodetector results should be integrated together to perform range estimation for target objects. This selection is based on spatiotemporal statistical coherency metrics. There are several ways to measure spatiotemporal statistical coherency such as by using distribution comparison metrics, Time of Flight (ToF) temporal statistics, and/or differences/advantages of a solution.

Distribution Comparison Metrics

A distribution comparison metric is a Kullback-Leibler (KL) divergence. For each pulse, the system obtains a new probability distribution (normalized histogram) by integrating the detections of pixels in a super pixel with a time bin step of 100. In other words, the twelve measurements are assigned to bins of width 100. As noted above, timestamps for measurements associated with a pulse P1 in TABLE 1 are [684, 559, 629, 192, 835, 763, 707, 359, 9, 723, 277, 754]. The timestamps can be assigned to bins as follows: 684 is placed in bin $b_{600\text{-}700}$; 559 is placed in bin $b_{600\text{-}600}$, and so on. A histogram H of the timestamps is determined by the following expressions: 1 detection (9) for $b_{0\text{-}100}$; 1 detection (192) for $b_{100\text{-}200}$; 1 detection (277) for $b_{200\text{-}300}$; 1 detection (359) for $b_{300\text{-}400}$; 0 detections for $b_{400\text{-}500}$; 1 detection (559) for $b_{500\text{-}600}$; 2 detections (629, 684) for $b_{600\text{-}700}$; 4 detections (763, 707, 723, 754) for $b_{700\text{-}800}$; and 1 detection (835) for $b_{800\text{-}900}$. Accordingly, the histogram H can be defined by the following expression:

$$H = [1, 1, 1, 1, 0, 1, 2, 4, 1].$$

The histogram H can be transformed into a probability distribution (or probability mass function (PMF)) by dividing the counts by the total number of counts (12), as shown by the following expression:

$$PMF1 = [1/12, 1/12, 1/12, 1/12, 0/12, 1/12, 2/12, 4/12, 1/12] = [0.0833, 0.0833, 0.0833, 0.0833, 0.0, 0.0833, 0.1667, 0.3333, 0.0833].$$

Following the same procedure (binning, histogram creation, and histogram transformation), the following additional PMFs are obtained for pulses P2, P3, P4, P5.

$$[0.1667, 0.0833, 0.0, 0.1667, 0.1667, 0.1667, 0.0833, 0.0833, 0.0833] \quad \text{PMF2}$$

$$[0.1, 0.1, 0.0, 0.0, 0.0, 0.1, 0.2, 0.3, 0.2] \quad \text{PMF3}$$

$$[.3333, 0.6667, 0.0, 0.0, 0.0, 0.0, 0.0, 0.0, 0.0] \quad \text{PMF4}$$

$$[0.1667, 0.8333, 0.0, 0.0, 0.0, 0.0, 0.0, 0.0, 0.0] \quad \text{PMF5}$$

Next, the KL divergence metric is used to detect a change in distribution. The KL metric generally provides a way to compare distributions. The dissimilarity in distribution can be used as a signal of distribution change, which indicates the start of a different integration span. The KL divergence metric is defined by the following mathematical equation (5).

$$D_{KL}(P \parallel Q) = \sum_{x \in X} P(x) \log\left(\frac{P(x)}{Q(x)}\right) \tag{5}$$

where Q is the current distribution and P is the distribution to be added. The KL divergences are computed as follows.

$$KL[P = PMF2, Q = PMF1] = 0.18$$

$$KL[P = PMF3, Q = PMF2] = 0.65$$

$$KL[P = PMF4, Q = PMF3] = 1.67$$

$$KL[P = PMF5, Q = PMF4] = 0.07$$

The KL divergence KL[P=PMF4, Q=PMF3] is higher in value than the other KL divergences KL[P=PMF2, Q=PMF1], KL[P=PMF3, Q=PMF2], KL[P=PMF5, Q=PMF4]. This indicates a change in distribution between the detections of the two pulses P3 and P4. As a result, integration of pulses is stopped until pulse P3 and integration of pulses is started (or restarted) at pulse P4.

ToF Temporal Statistics

The ToF temporal statistics can include, but are not limited to, a ToF temporal spread. The ToF temporal spread can be obtained by calculating the variance of sorted ToF differences. First, the ToF measurements or timestamps for each super pixel are sorted from smallest value to largest value as shown in the following expressions.

$$[9, 192, 277, 359, 559, 629, 684, 707, 723, 754, 763, 835] \quad P1$$

$$[70, 87, 174, 314, 396, 472, 486, 551, 599, 600, 705, 804] \quad P2$$

$$[72, 115, 537, 600, 677, 709, 755, 777, 845, 849, 916, 976] \quad P3$$

$$[7, 99, 99, 99, 100, 100, 100, 100, 101, 101, 101, 102] \quad P4$$

$$[98, 99, 100, 100, 100, 100, 100, 100, 101, 101, 101, 102] \quad P5$$

Next, computations are performed to calculate a set D of difference timestamp values for each pulse. The set $D_{p1}$ of difference timestamp values for the first pulse P1 are computed as follows, where each different timestamp value is a difference between two consecutive timestamps.

$$D_{p1}: [192-9, 277-192, 359-277, 559-359, 629-559, 684-629, 707-684, 723-707, 754-723, 763-754, 835-763] = [183, 85, 82, 200, 70, 55, 23, 16, 31, 9, 72]$$

Similar computations are performed to obtain the following sets $D_{p3}$, $D_{p4}$, $D_{p5}$ of difference timestamp values for the other four pulses P2, P3, P4, P5.

$$D_{p2} = [17, 87, 140, 82, 76, 14, 65, 48, 1, 105, 99]$$

$$D_{p3} = [43, 422, 63, 77, 32, 46, 22, 68, 4, 67, 60]$$

$$D_{p4} = [2, 0, 0, 1, 0, 0, 0, 1, 0, 0, 1]$$

$$D_{p5} = [1, 1, 0, 0, 0, 0, 0, 1, 0, 0, 1]$$

Next, the system measures a variance of the difference timestamp values in each set $D_{p1}$, $D_{p2}$, $D_{p3}$, $D_{p4}$, $D_{p5}$. Each variance is computed by: (i) calculating the mean of a set of different timestamp values; (ii) subtracting the mean from each difference timestamp value of the set; (iii) take the square of the values obtained in step (ii); (iv) add all the values obtained in (iii); and (v) divide the value obtained in (iv) by the total number of difference timestamp values in the set. For example, the variance $V_{DP1}$ for set $D_{p1}$ is determined as follows.

$$\text{Mean} = (183 + 85 + 82 + 200 + 70 + 55 + 23 + 16 + 31 + 9 + 72)/11 = 75.09 \tag{i}$$

$$(183 - 75.09 = 107.91), (85 - 75.09 = 9.91), (82 - 75.09 = 6.91), (200 - 75.09 = 124.91), (70 - 75.09 = -5.09), (55 - 75.09 = -20.09), (23 - 75.09 = -52.09), (16 - 75.09 = -59.09), (31 - 75.09 = -44.09), (9 - 75.09 = -66.09), (72 - 75.09 = -3.09) \tag{ii}$$

$$(107.91^2 = 11{,}644.5681), (9.91^2 = 98.2081), (6.91^2 = 47.7481), (124.91^2 = 15602.5081), (-5.09^2 = 25.9081), (-20.09^2 = 403.6081), (-52.09^2 = 2713.3681), (-59.09^2 = 3491.6281), (-44.09^2 = 1943.9281), (-66.09^2 = 4367.8881), (-3.09^2 = 9.5481) \tag{iii}$$

$$11644.5681 + 98.2081 + 47.7481 + 15602.5081 + 25.9081 + 403.6081 + 2713.3681 + 3491.6281 + 4367.8881 + 9.5481 = 40{,}348.9091 \tag{iv}$$

$$40{,}348.9091/11 = 3668.08 \tag{v}$$

The following variances for the other sets $D_{p2}$, $D_{p3}$, $D_{p4}$, $D_{p5}$ can be computed in a similar manner.

$$V_{DP2} = 1684.74$$

$$V_{DP3} = 11990.15$$

$$V_{DP4} = 0.43$$

$$V_{DP5} = 0.23$$

As evident from the variances, the temporal spreading measured in relation to pulses P1-P3 is very high compared with that measured in relation to pulses P4 and P5. This can be considered an indication that pulses P4 and P5 are integrating measurements of different target objects that are captured by pulses P1-P3.

It is important to point out that the second method is cheaper to calculate as it does not require histogram creation as the first method (although a very coarse histogram can be used for KL divergence). However, the second method cannot distinguish between measurements obtained from two targets at two different ranges that may yield similar temporal spreading (localized measurements for both ranges). In this case, a joint mean and variance measurement may be taken into consideration.

It is possible to use the spatiotemporal coherency to reject noisy measurements instead of using it as stopping criteria for measurement integrations. For example, a third pulse P3 out of ten pulses can have incoherent statistical measurements due to interference. Instead of stopping the integration at two pulses, the system can drop the incoherent measurements obtained by the third pulse and resume the integration.

In addition to the stop criteria proposed above, a wide variety of "stop criteria" are possible. Some examples of novel stop criteria: aggregate multiples of a fixed number of laser firings until the confidence (or other statistical metric for probability of detection) of detected peak exceeds a given threshold; aggregate multiples of a fixed number of laser firings until the confidence of detected peak starts to decrease by integrating more pulses; aggregate laser firings in a sliding window fashion until either of the above two criteria are met; and/or aggregate multiples of a fixed number of laser firings restricted by neighboring point estimate aggregation window sizes and reflectivity estimation, such that the lidar sensor emits a quadtree in the 2D range image plane.

Note that there is no requirement that the same aggregation function or value is used on different axes. So, the system may (if chosen at design time) emit points corresponding to square or non-square solid angles of the overall sensor frustum. In particular, sliding window aggregation schemes have no real correspondence to "image plane pixels" as they may operate on much smaller units of individual laser firings. In any range imaging system, the representation of an observation as a point is a gross simplification, and a better first order approximation might well be an oriented plane or surface element.

There is also no requirement that reflectivity or similar be used to guide the aggregation. Other properties of the intermediate measurements may be used instead. For example, the depth recovered itself can be used to guide continued aggregation—moving the decimation of surfaces close to the vehicle into the lidar accumulator itself. Such an implementation would be useful to establish constant point density in world space (range sensors typically suffer from 'data overload' close to the sensor in order to obtain sufficient point density far from the sensor).

The present solution can be designed to efficiently trade off in software properties of the depth imaging system such as reflectivity performance, probability of detection, range, and resolution. These axes are typically fixed at design time and a function of the hardware, but the present solution may move these decisions into the software realm. Moreover, use of the present solution permits generation of point clouds with constant density for any volume of world space as part of the lidar system (which is highly unconventional) or generation of varying density point clouds or surface clouds as a function of other imaging properties such as estimated surface reflectivity.

The spatiotemporal coherence metric in particular has two advantages: it provides immunity against noise and interference as well as provides a robust integration stop criteria to support variable resolution architecture.

Figure 5:
FIG. 5 provides a flow diagram of an illustrative method for variable resolution refinement in Geiger mode lidar.

FIG. 5 provides a flow diagram of an illustrative method 500 for operating a lidar system (for example, lidar system 100 of FIG. 1). Method 500 can be entirely or partially performed by a computing device (for example, analyzer 114 of FIG. 1 and/or processor 122 of FIG. 1) of the lidar system and/or a computer system external to and/or remote from the lidar system (for example, a vehicle's on-board computing device).

Method 500 begins with 502 and continues with 504 where a light pulse (for example, pulse P1 of FIG. 4) is emitted from the lidar system. In 506, photodetectors (for example, photodetectors 126 of FIG. 1) receive light reflected back into the lidar system. Timestamps are generated in 508 when the photodetectors detect photons at or near a target wavelength. The timestamps are combined in 510 to generate super pixels (for example, super pixels $SP_1, \ldots SP_{n/2}, SP_{(n/2)-y}, \ldots, SP_Y$ of FIG. 2).

The operations of blocks 504-510 are repeated any number of times as shown by 512. The number of iterations can be a fixed pre-defined number. In the above examples, the operations of blocks 504-510 are performed five times so that detections for five pulses P1, P2, P3, P4, P5 are made. The present solution is not limited in this regard. Any number of iterations of operations 504-510 can be performed in accordance with a given application.

Alternatively, the number of iterations can be a variable number which may be dynamically determined based on spatiotemporal metrics. For example, in some scenarios, a detection score is obtained per pulse for each timestamp or group of timestamps. Each detection score may indicate a level of confidence or validity of an object detection. A machine learning algorithm or weighted timestamp computation can be used to obtain the detection score. The iterative process is discontinued when the detection score exceeds a threshold value or when an aggregate or combined detection score exceeds a threshold value. Next, method 500 continues to 514 which will be discussed below. In other scenarios, distribution comparison metrics (for example, KL divergences) or ToF temporal statics (for example, measured variances) are used in 512 to determine when to stop the iterative process and continue to 514.

In yet other scenarios, a hybrid approach can be employed to determine when continue to 514. For example, five pulses may be added at a time. So, in this example, a first iteration of a KL divergence process is performed for a first set of five pulses to identify pulses in the set (for example, pulse 4 and pulse 5 in the first set). A second iteration of the KL divergence process is performed for a next second set of five pulses to identify pulses in the set (for example, pulse 1, pulse 2 and pulse 3 in the second set). When a total of five pulses have been identified, method 500 continues to 512. The present solution is not limited in this regard. Identification of any total number of pulses can stop performance of a next iteration of operations 504-510. Also, the identified pulses may or may not be consecutive in relation to time.

In 514, spatiotemporal coherence metrics are obtained using the super pixels to facilitate subsequent identification of pulses and/or pixels for integration. The spatiotemporal coherence metrics can be the same as or different than those obtained in 512. The spatiotemporal coherence metrics can be obtained here in accordance with any of the following techniques when a fixed number of pulses or a variable number of pulses are under consideration: a distribution comparison metric technique; a ToF temporal static technique; and/or a detection score technique. The distribution comparison metric technique generally involves obtaining distribution comparison metrics which each specify a change in distribution between detections of two pulses or two groups of pulses by the photodetectors. The distribution comparison metrics can include, but are not limited to, KL divergence values. Thresholds are determined based on application and the desirable sensitivity to surface variations. For the example above, a threshold of one can be used. Note that other types of values that could be used include total variation distance, Wasserstein distance, and/or Kolmogorov-Smirnov distance. There are a wide variety of statistical tests that describe the differences between distributions. The ToF temporal statistic technique generally involves measuring a variance for each pulse of the difference between consecutive timestamps that have been sorted from lowest value to highest value (or vice versa). The detection score technique generally involves obtaining a detection score per pulse for each timestamp or group of timestamps. Each detection score may indicate a level of confidence or validity of an object detection. A machine learning algorithm or weighted timestamp computation can be used to obtain the detection score.

The spatiotemporal metrics obtained in 514 are then used in 516 to select a subset of light pulses of the set under consideration (for example, pulses P1-P5 of FIG. 4) and/or groups of pixels. As noted above, the results values of the photodetectors are also referred to as pixels. If the distribution comparison metric technique is employed in 514, then pulses and/or a group of pixels is/are selected based on the distribution change. For example, the pulses which are selected comprise a pulse associated with the highest KL divergence value and pulse(s) subsequent to this pulse in the group of pulses under consideration. The group of pixels may comprise those associated with the selected pulses. The present solution is not limited in this regard. If the ToF temporal statistic technique is employed in 514, then pulses and/or a group of pixels is/are selected based on measured variance values. More specifically, the pulses or pixels that are associated with relatively low measured variance values are selected. If the detection score technique is employed in 514, then a pulse is selected when a respective detection score exceeds a threshold value and/or a group of pixels is selected when an aggregated or combined score exceeds a threshold value.

Figure 6:
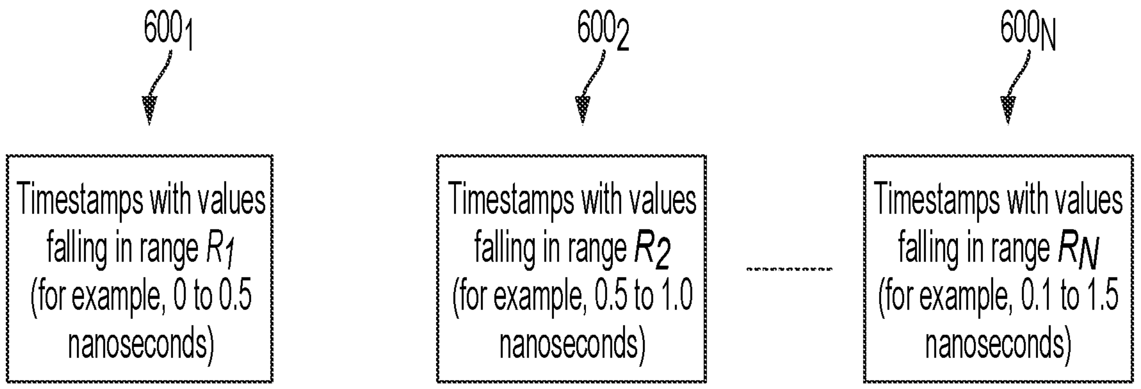
FIG. 6 provides an illustration that is useful for understanding binning.
Figure 7:
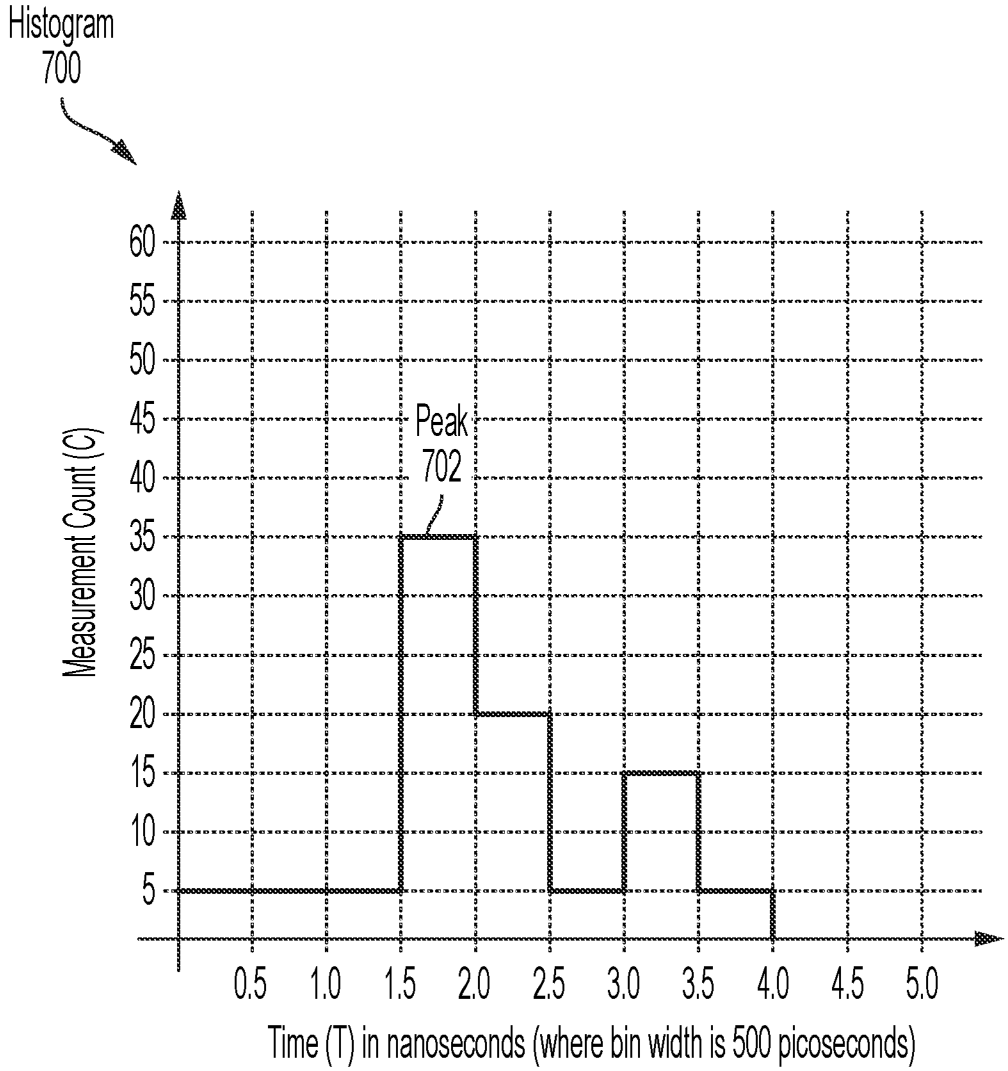
FIG. 7 provides an illustration of a histogram.

Upon completing 516, method 500 continues with optional 518-526. 518-522 involve: assigning timestamps associated with the selected pulses or pixels to bins; building a histogram using the bins of timestamps; and identifying a peak of the histogram. An illustration is provided in FIG. 6 which shows timestamps assigned to bins $\mathbf{600}_1$, $\mathbf{600}_2$, $\mathbf{600}_3$. An illustrative histogram 700 is shown in FIG. 7 with a peak 702. In 524, the time associated with the peak of the histogram is mapped or otherwise transformed to a distance between the lidar system and a target object. The peak value and/or distance may be used in 526 to generate a map, control operations of a vehicle and/or dispatch personnel to a geographic area or location. Subsequently, 530 is performed where method 500 ends or other operations are performed (for example, return to 504).

The above described lidar system can be used in various applications. The present solution will now be described in the context of autonomous vehicles. However, the present solution is not limited to autonomous vehicle applications. The present solution can be used in other applications such as robotic applications (for example to control movements of articulating arms) and/or system performance applications.

Figure 8:
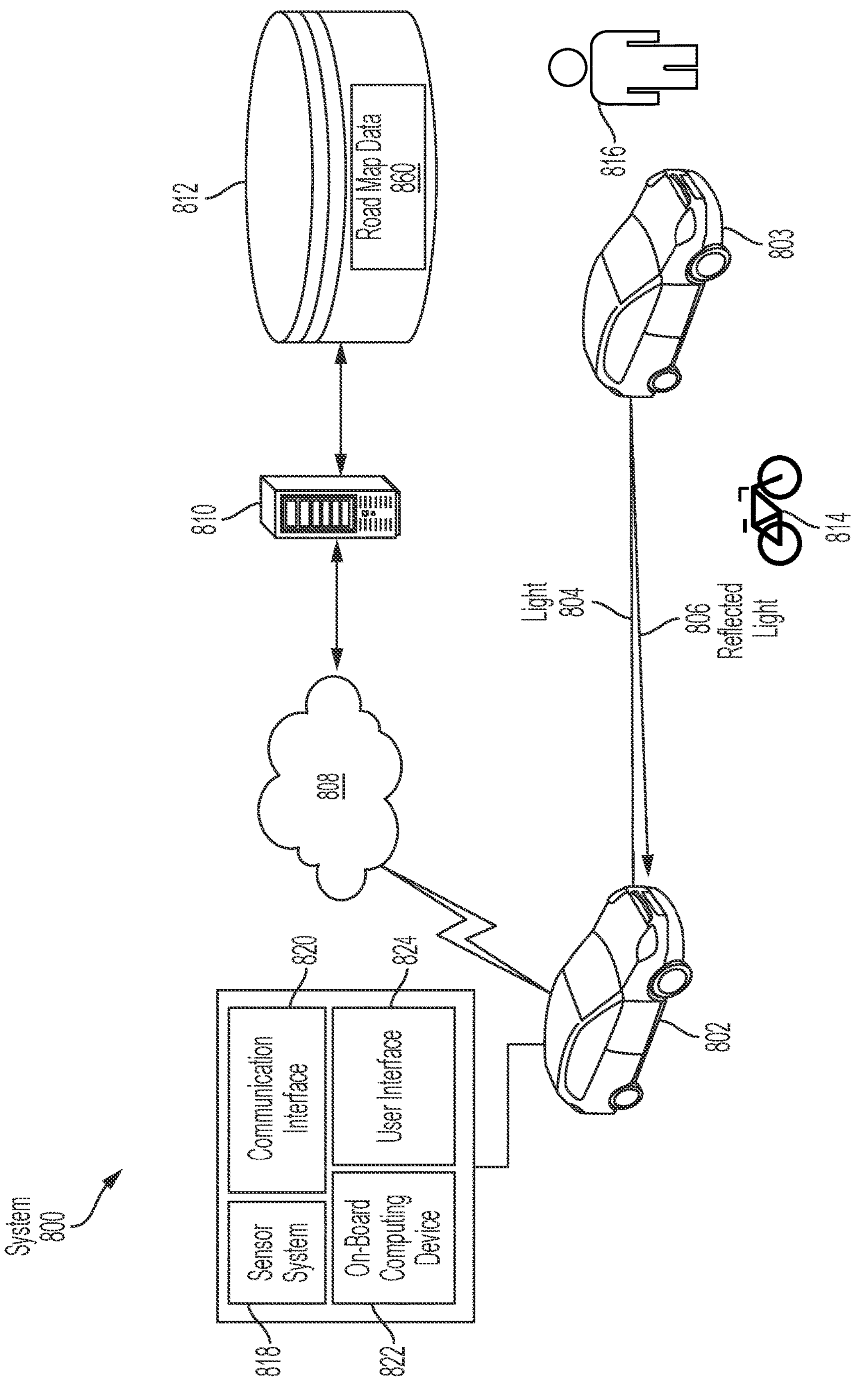
FIG. 8 provides an illustration of a system.

FIG. 8 illustrates an example system 800, in accordance with aspects of the disclosure. System 800 comprises a vehicle 802 that is traveling along a road in a semi-autonomous or autonomous manner. Vehicle 802 is also referred to in this document as AV 802. AV 802 can include, but is not limited to, a land vehicle (as shown in FIG. 8), an aircraft, or a watercraft. As noted above, except where specifically noted this disclosure is not necessarily limited to AV embodiments, and it may include non-autonomous vehicles in some embodiments.

AV 802 is generally configured to detect objects in its proximity. The objects can include, but are not limited to, a vehicle 803, cyclist 814 (such as a rider of a bicycle, electric scooter, motorcycle, or the like) and/or a pedestrian 816.

As illustrated in FIG. 8, the AV 802 may include a sensor system 818, an on-board computing device 822, a communications interface 820, and a user interface 824. Autonomous vehicle system may further include certain components (as illustrated, for example, in FIG. 9) included in vehicles, which may be controlled by the on-board computing device 822 using a variety of communication signals and/or commands, such as, for example, acceleration signals or commands, deceleration signals or commands, steering signals or commands, braking signals or commands, etc.

The sensor system 818 may include one or more sensors that are coupled to and/or are included within the AV 802. For example, such sensors may include, without limitation, a lidar system, a radio detection and ranging (radar) system, a laser detection and ranging (LADAR) system, a sound navigation and ranging (sonar) system, one or more cameras (for example, visible spectrum cameras, infrared cameras, etc.), temperature sensors, position sensors (for example, a global positioning system (GPS), etc.), location sensors, fuel sensors, motion sensors (for example, an inertial measurement unit (IU), etc.), humidity sensors, occupancy sensors, or the like. The sensor data can include information that describes the location of objects within the surrounding environment of the AV 802, information about the environment itself, information about the motion of the AV 802, information about a route of the vehicle, or the like. As AV 802 travels over a surface, at least some of the sensors may collect data pertaining to the surface.

The AV 802 may also communicate sensor data collected by the sensor system to a remote computing device 810 (for example, a cloud processing system) over communications network 808. Remote computing device 810 may be configured with one or more servers to perform one or more processes of the technology described in this document. Remote computing device 810 may also be configured to communicate data/instructions to/from AV 802 over network 808, to/from server(s) and/or datastore(s) 812. Datastore(s) 812 may include, but are not limited to, database(s).

Network 808 may include one or more wired or wireless networks. For example, the network 808 may include a cellular network (for example, a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (for example, the Public Switched Telephone Network (PSTN)), a private network, an ad hoc network, an intranet, the Internet, a fiber optic-based network, a cloud computing network, and/or the like, and/or a combination of these or other types of networks.

AV 802 may retrieve, receive, display, and edit information generated from a local application or delivered via network 808 from datastore 812. Datastore 812 may be configured to store and supply raw data, indexed data, structured data, road map data 860, program instructions or other configurations as is known.

The communications interface 820 may be configured to allow communication between AV 802 and external systems, such as, for example, external devices, sensors, other vehicles, servers, data stores, databases, etc. The communications interface 820 may utilize any now or hereafter known protocols, protection schemes, encodings, formats, packaging, etc. such as, without limitation, Wi-Fi, an infrared link, Bluetooth, etc. The user interface system 824 may be part of peripheral devices implemented within the AV 802 including, for example, a keyboard, a touch screen display device, a microphone, and a speaker, etc. The vehicle also may receive state information, descriptive information or other information about devices or objects in its environment via the communication interface 820 over communication links such as those known as vehicle-to-vehicle, vehicle-to-object or other V2X communication links. The term "V2X" refers to a communication between a vehicle and any object that the vehicle may encounter or affect in its environment.

Figure 9:
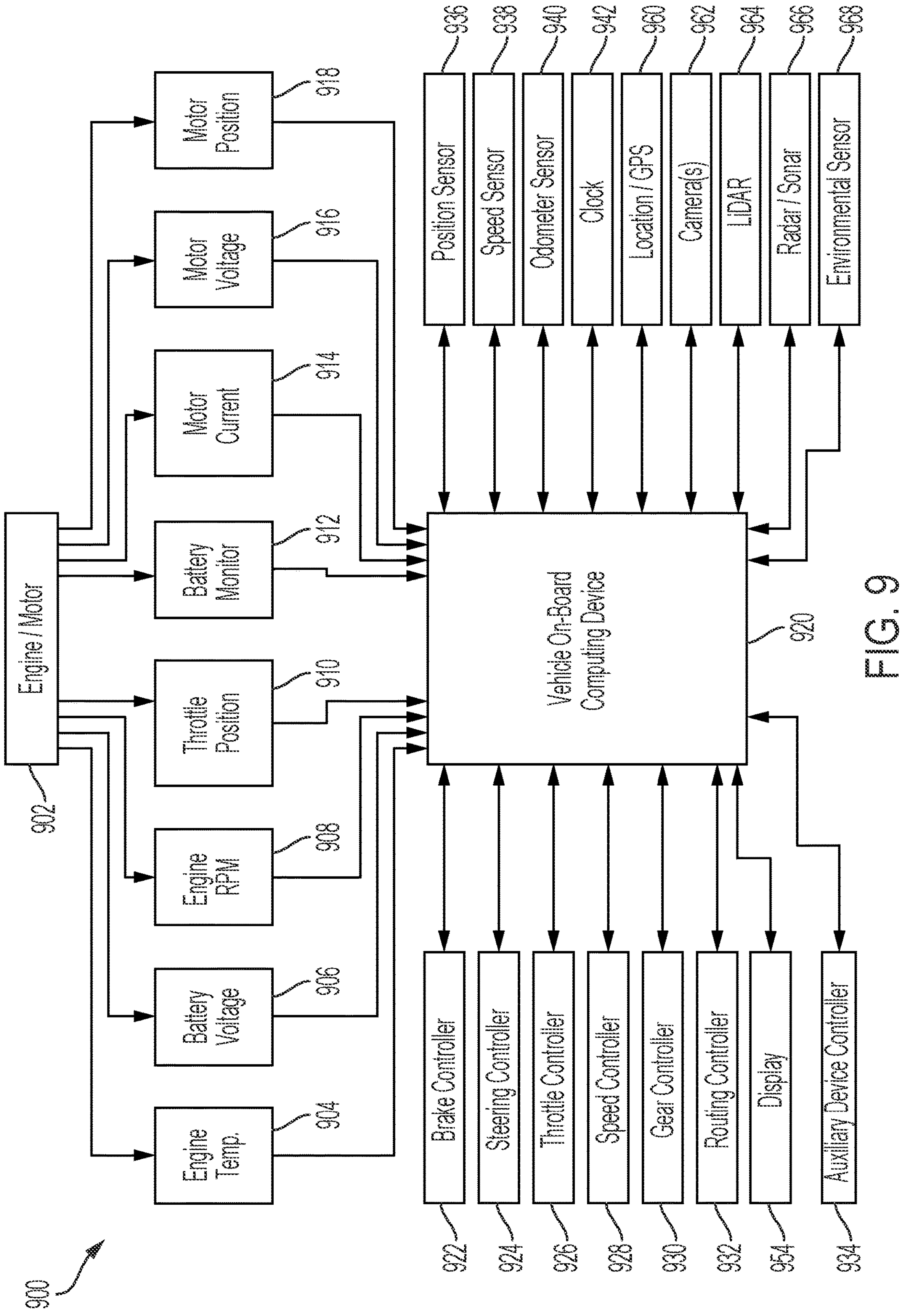
FIG. 9 provides a more detailed illustration of an autonomous vehicle.

FIG. 9 illustrates an example system architecture 900 for a vehicle, in accordance with aspects of the disclosure. Vehicles 802 and/or 803 of FIG. 8 can have the same or similar system architecture as that shown in FIG. 9. Thus, the following discussion of system architecture 900 is sufficient for understanding vehicle(s) 802, 803 of FIG. 8. However, other types of vehicles are considered within the scope of the technology described in this document and may contain more or less elements as described in association with FIG. 9. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 9, system architecture 900 for a vehicle includes an engine or motor 902 and various sensors 904-918 for measuring various parameters of the vehicle. In gas-powered or hybrid vehicles having a fuel-powered engine, the sensors may include, for example, an engine temperature sensor 904, a battery voltage sensor 906, an engine revolutions per minute (RPM) sensor 908, and a throttle position sensor 910. If the vehicle is an electric or hybrid vehicle, then the vehicle may have an electric motor, and accordingly includes sensors such as a battery monitoring system 912 (to measure current, voltage and/or temperature of the battery), motor current 914 and voltage 916 sensors, and motor position sensors 918 such as resolvers and encoders.

Operational parameter sensors that are common to both types of vehicles include, for example: a position sensor 936 such as an accelerometer, gyroscope and/or inertial measurement unit; a speed sensor 938; and an odometer sensor 940. The vehicle also may have a clock 942 that the system uses to determine vehicle time during operation. The clock 942 may be encoded into the vehicle on-board computing device, it may be a separate device, or multiple clocks may be available.

The vehicle also may include various sensors that operate to gather information about the environment in which the vehicle is traveling. These sensors may include, for example: a location sensor 960 (such as a Global Positioning System (GPS) device); object detection sensors such as one or more cameras 962; a lidar system 964; and/or a radar and/or a sonar system 966. The sensors also may include environmental sensors 968 such as a precipitation sensor and/or ambient temperature sensor. The object detection sensors may enable the vehicle to detect objects that are within a given distance range of the vehicle in any direction, while the environmental sensors collect data about environmental conditions within the vehicle's area of travel.

During operations, information is communicated from the sensors to a vehicle on-board computing device 920. The vehicle on-board computing device 920 may be implemented using the computer system of FIG. 11. The vehicle on-board computing device 920 analyzes the data captured by the sensors and optionally controls operations of the vehicle based on results of the analysis. For example, the vehicle on-board computing device 920 may control: braking via a brake controller 922; direction via a steering controller 924; speed and acceleration via a throttle controller 926 (in a gas-powered vehicle) or a motor speed controller 928 (such as a current level controller in an electric vehicle); a differential gear controller 930 (in vehicles with transmissions); and/or other controllers. Auxiliary device controller 934 may be configured to control one or more auxiliary devices, such as testing systems, auxiliary sensors, mobile devices transported by the vehicle, etc.

Geographic location information may be communicated from the location sensor 960 to the vehicle on-board computing device 920, which may then access a map of the environment that corresponds to the location information to determine known fixed features of the environment such as streets, buildings, stop signs and/or stop/go signals. Captured images from the cameras 962 and/or object detection information captured from sensors such as lidar system 964 is communicated from those sensors) to the vehicle on-board computing device 920. The object detection information and/or captured images are processed by the vehicle on-board computing device 920 to detect objects in proximity to the vehicle. Any known or to be known technique for making an object detection based on sensor data and/or captured images can be used in the embodiments disclosed in this document.

Lidar information is communicated from lidar system 964 to the vehicle on-board computing device 920. Additionally, captured images are communicated from the camera(s) 962 to the vehicle on-board computing device 920. The lidar information and/or captured images are processed by the vehicle on-board computing device 920 to detect objects in proximity to the vehicle. The manner in which the object detections are made by the vehicle on-board computing device 920 includes such capabilities detailed in this disclosure.

In addition, the system architecture 900 may include an onboard display device 954 that may generate and output an interface on which sensor data, vehicle status information, or outputs generated by the processes described in this document are displayed to an occupant of the vehicle. The display device may include, or a separate device may be, an audio speaker that presents such information in audio format.

The vehicle on-board computing device 920 may include and/or may be in communication with a routing controller 932 that generates a navigation route from a start position to a destination position for an autonomous vehicle. The routing controller 932 may access a map data store to identify possible routes and road segments that a vehicle can travel on to get from the start position to the destination position. The routing controller 932 may score the possible routes and identify a preferred route to reach the destination. For example, the routing controller 932 may generate a navigation route that minimizes Euclidean distance traveled or other cost function during the route, and may further access the traffic information and/or estimates that can affect an amount of time it will take to travel on a particular route. Depending on implementation, the routing controller 932 may generate one or more routes using various routing methods, such as Dijkstra's algorithm, Bellman-Ford algorithm, or other algorithms. The routing controller 932 may also use the traffic information to generate a navigation route that reflects expected conditions of the route (for example, current day of the week or current time of day, etc.), such that a route generated for travel during rush-hour may differ from a route generated for travel late at night. The routing controller 932 may also generate more than one navigation route to a destination and send more than one of these navigation routes to a user for selection by the user from among various possible routes.

In various embodiments, the vehicle on-board computing device 920 may determine perception information of the surrounding environment of the AV. Based on the sensor data provided by one or more sensors and location information that is obtained, the vehicle on-board computing device 920 may determine perception information of the surrounding environment of the AV. The perception information may represent what an ordinary driver would perceive in the surrounding environment of a vehicle. The perception data may include information relating to one or more objects in the environment of the AV. For example, the vehicle on-board computing device 920 may process sensor data (for example, lidar or radar data, camera images, etc.) in order to identify objects and/or features in the environment of AV. The objects may include traffic signals, roadway boundaries, other vehicles, pedestrians, and/or obstacles, etc. The vehicle on-board computing device 920 may use any now or hereafter known object recognition algorithms, video tracking algorithms, and computer vision algorithms (for example, track objects frame-to-frame iteratively over a number of time periods) to determine the perception.

In some embodiments, the vehicle on-board computing device 920 may also determine, for one or more identified objects in the environment, the current state of the object. The state information may include, without limitation, for each object: current location; current speed and/or acceleration, current heading; current pose; current shape, size, or footprint; type (for example: vehicle, pedestrian, bicycle, static object or obstacle); and/or other state information.

The vehicle on-board computing device 920 may perform one or more prediction and/or forecasting operations. For example, the vehicle on-board computing device 920 may predict future locations, trajectories, and/or actions of one or more objects. For example, the vehicle on-board computing device 920 may predict the future locations, trajectories, and/or actions of the objects based at least in part on perception information (for example, the state data for each object comprising an estimated shape and pose determined as discussed below), location information, sensor data, and/or any other data that describes the past and/or current state of the objects, the AV, the surrounding environment, and/or their relationship(s). For example, if an object is a vehicle and the current driving environment includes an intersection, the vehicle on-board computing device 920 may predict whether the object will likely move straight forward or make a turn. If the perception data indicates that the intersection has no traffic light, the vehicle on-board computing device 920 may also predict whether the vehicle may have to fully stop prior to entering the intersection.

In various embodiments, the vehicle on-board computing device 920 may determine a motion plan for the autonomous vehicle. For example, the vehicle on-board computing device 920 may determine a motion plan for the autonomous vehicle based on the perception data and/or the prediction data. Specifically, given predictions about the future locations of proximate objects and other perception data, the vehicle on-board computing device 920 can determine a motion plan for the AV that best navigates the autonomous vehicle relative to the objects at their future locations.

In some embodiments, the vehicle on-board computing device 920 may receive predictions and make a decision regarding how to handle objects and/or actors in the environment of the AV. For example, for a particular actor (for example, a vehicle with a given speed, direction, turning angle, etc.), the vehicle on-board computing device 920 decides whether to overtake, yield, stop, and/or pass based on, for example, traffic conditions, map data, state of the autonomous vehicle, etc. Furthermore, the vehicle on-board computing device 920 also plans a path for the AV to travel on a given route, as well as driving parameters (for example, distance, speed, and/or turning angle). That is, for a given object, the vehicle on-board computing device 920 decides what to do with the object and determines how to do it. For example, for a given object, the vehicle on-board computing device 920 may decide to pass the object and may determine whether to pass on the left side or right side of the object (including motion parameters such as speed). The vehicle on-board computing device 920 may also assess the risk of a collision between a detected object and the AV. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (for example, N milliseconds). If the collision can be avoided, then the vehicle on-board computing device 920 may execute one or more control instructions to perform a cautious maneuver (for example, mildly slow down, accelerate, change lane, or swerve). In contrast, if the collision cannot be avoided, then the vehicle on-board computing device 920 may execute one or more control instructions for execution of an emergency maneuver (for example, brake and/or change direction of travel).

As discussed above, planning and control data regarding the movement of the autonomous vehicle is generated for execution. The vehicle on-board computing device 920 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Figure 10:
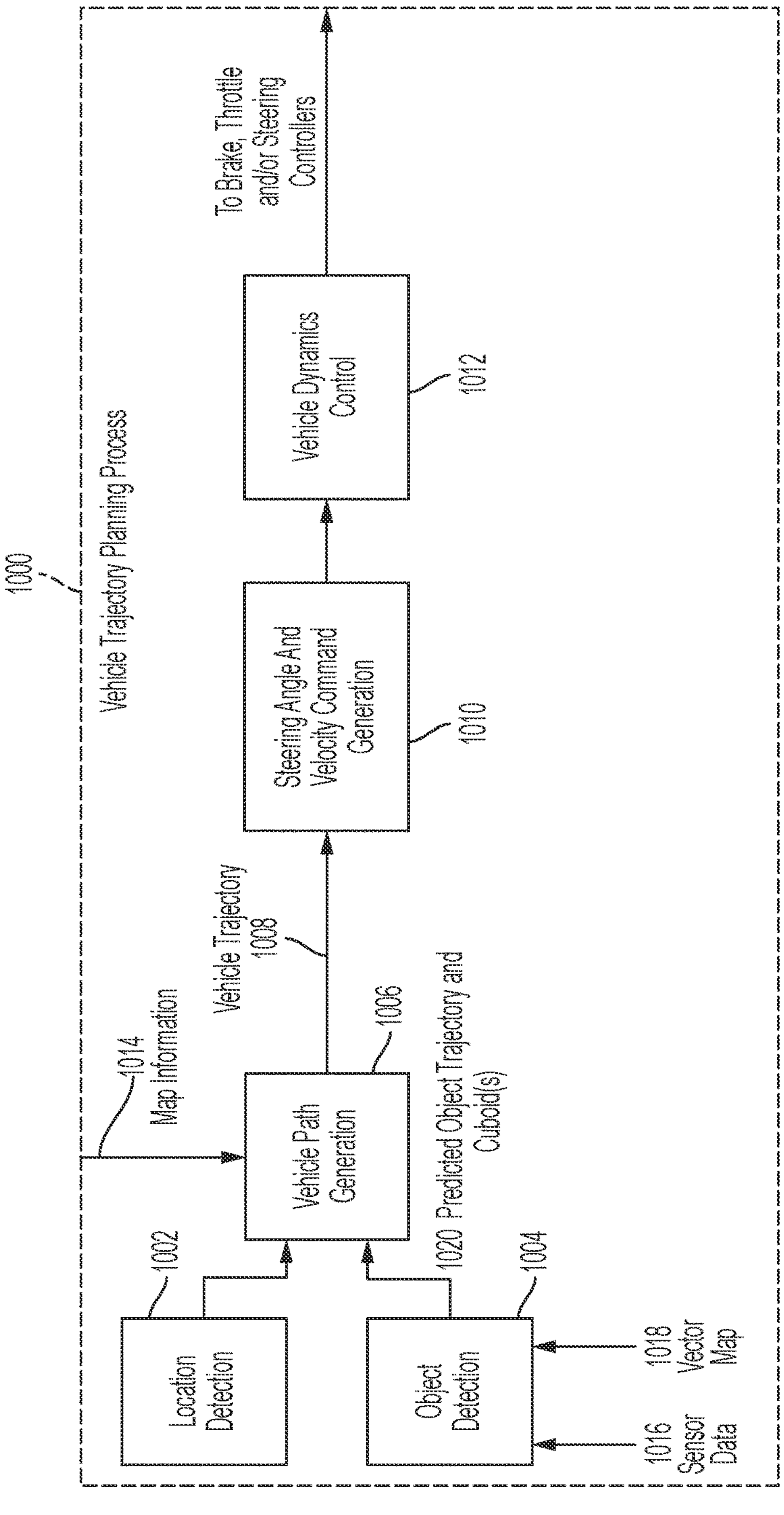
FIG. 10 provides a block diagram of an illustrative vehicle trajectory planning process.

FIG. 10 provides a block diagram that is useful for understanding how motion or movement of an AV is achieved in accordance with the present solution. All of the operations performed in blocks 1002-1012 can be performed by the on-board computing device (for example, on-board computing device 822 of FIGS. 8 and/or 920 of FIG. 9) of a vehicle (for example, AV 802 of FIG. 8).

In block 1002, a location of the AV (for example, AV 802 of FIG. 8) is detected. This detection can be made based on sensor data output from a location sensor (for example, location sensor 960 of FIG. 9) of the AV. This sensor data can include, but is not limited to, GPS data. The detected location of the AV is then passed to block 1006.

In block 1004, an object (for example, vehicle 803 of FIG. 8) is detected within proximity of the AV (for example, <100+ meters). This detection is made based on sensor data output from a camera (for example, camera 962 of FIG. 9) of the AV and/or a lidar system (for example, lidar system 964 of FIG. 9) of the AV. For example, image processing is performed to detect an instance of an object of a certain class (for example, a vehicle, cyclist or pedestrian) in an image. The image processing/object detection can be achieved in accordance with any known or to be known image processing/object detection algorithm.

Additionally, a predicted trajectory is determined in block 1004 for the object. The object's trajectory is predicted in block 1004 based on the object's class, cuboid geometry(ies), cuboid heading(s) and/or contents of a map 1018 (for example, sidewalk locations, lane locations, lane directions of travel, driving rules, etc.). The manner in which the cuboid geometry(ies) and heading(s) are determined will become evident as the discussion progresses. At this time, it should be noted that the cuboid geometry(ies) and/or heading(s) are determined using sensor data of various types (for example, 2D images, 3D lidar point clouds) and a vector map 1018 (for example, lane geometries). Techniques for predicting object trajectories based on cuboid geometries and headings may include, for example, predicting that the object is moving on a linear path in the same direction as the heading direction of a cuboid. The predicted object trajectories can include, but are not limited to, the following trajectories: a trajectory defined by the object's actual speed (for example, 1 mile per hour) and actual direction of travel (for example, west); a trajectory defined by the object's actual speed (for example, 1 mile per hour) and another possible direction of travel (for example, south, south-west, or X (for example, 40°) degrees from the object's actual direction of travel in a direction towards the AV) for the object; a trajectory defined by another possible speed for the object (for example, 2-10 miles per hour) and the object's actual direction of travel (for example, west); and/or a trajectory defined by another possible speed for the object (for example, 2-10 miles per hour) and another possible direction of travel (for example, south, south-west, or X (for example, 40°) degrees from the object's actual direction of travel in a direction towards the AV) for the object. The possible speed(s) and/or possible direction(s) of travel may be pre-defined for objects in the same class and/or sub-class as the object. It should be noted once again that the cuboid defines a full extent of the object and a heading of the object. The heading defines a direction in which the object's front is pointed, and therefore provides an indication as to the actual and/or possible direction of travel for the object.

Information 1020 specifying the object's predicted trajectory, the cuboid geometry(ies)/heading(s) is provided to block 1006. In some scenarios, a classification of the object is also passed to block 1006. In block 1006, a vehicle trajectory is generated using the information from blocks 1002 and 1004. Techniques for determining a vehicle trajectory using cuboids may include, for example, determining a trajectory for the AV that would pass the object when the object is in front of the AV, the cuboid has a heading direction that is aligned with the direction in which the AV is moving, and the cuboid has a length that is greater than a threshold value. The present solution is not limited to the particulars of this scenario. The vehicle trajectory 1020 can be determined based on the location information from block 1002, the object detection information from block 1004, and/or map information 1014 (which is pre-stored in a data store of the vehicle). The map information 1014 may include, but is not limited to, all or a portion of road map(s) 860 of FIG. 8. The vehicle trajectory 1020 may represent a smooth path that does not have abrupt changes that would otherwise provide passenger discomfort. For example, the vehicle trajectory is defined by a path of travel along a given lane of a road in which the object is not predicted to travel within a given amount of time. The vehicle trajectory 1020 is then provided to block 1008.

In block 1010, a steering angle and velocity command is generated based on the vehicle trajectory 1020. The steering angle and velocity command are provided to block 1010 for vehicle dynamics control, i.e., the steering angle and velocity command causes the AV to follow the vehicle trajectory 1008.

Figure 11:
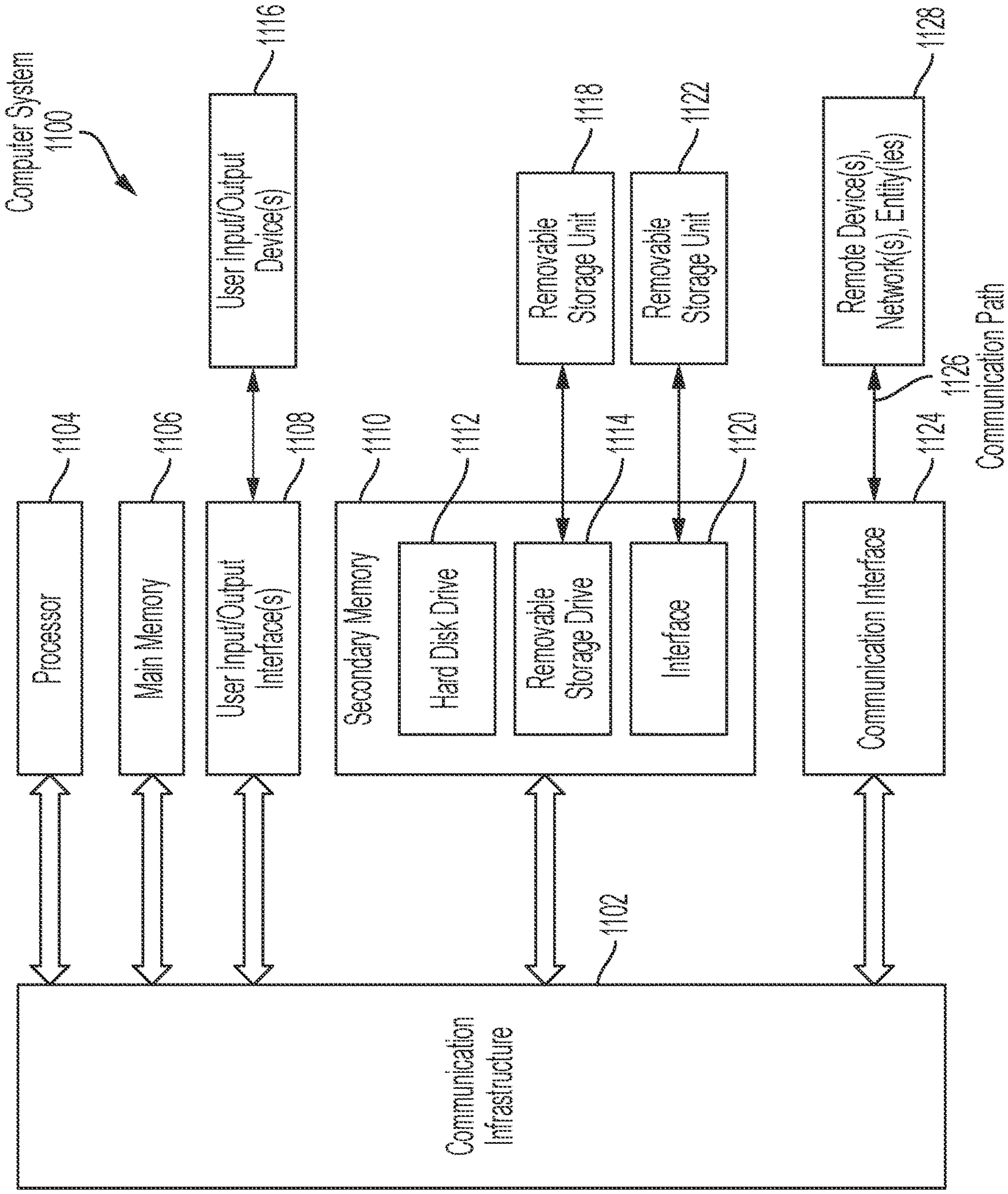
FIG. 11 provides an illustration of a computer system.

Various embodiments can be implemented, for example, using one or more computer systems, such as computer system 1100 shown in FIG. 11. Computer system 1100 can be any computer capable of performing the functions described in this document.

Computer system 1100 includes one or more processors (also called central processing units, or CPUs), such as a processor 1104. Processor 1104 is connected to a communication infrastructure or bus 1102. Optionally, one or more of the processors 1104 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 also includes user input/output device(s) 1116, such as monitors, keyboards, pointing devices, etc., that communicate with communication infrastructure 1102 through user input/output interface(s) 1108.

Computer system 1100 also includes a main or primary memory 1106, such as random access memory (RAM). Main memory 1106 may include one or more levels of cache. Main memory 1106 has stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be an external hard drive, a universal serial bus (USB) drive, a memory card such as a compact flash card or secure digital memory, a floppy disk drive, a magnetic tape drive, a compact disc drive, an optical storage device, a tape backup device, and/or any other storage device/drive.

Removable storage drive 1114 may interact with a removable storage unit 1118. Removable storage unit 1118 includes a computer usable or readable storage device having stored thereon computer software (control logic) and/or data. Removable storage unit 1118 may be an external hard drive, a universal serial bus (USB) drive, a memory card such as a compact flash card or secure digital memory, a floppy disk, a magnetic tape, a compact disc, a DVD, an optical storage disk, and/any other computer data storage device. Removable storage drive 1114 reads from and/or writes to removable storage unit 1118 in a well-known manner.

According to an example embodiment, secondary memory 1110 may include other means, instrumentalities or other approaches for allowing computer programs and/or other instructions and/or data to be accessed by computer system 1100. Such means, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 enables computer system 1100 to communicate and interact with any combination of remote devices, remote networks, remote entities, etc. (individually and collectively referenced by reference number 1128). For example, communication interface 1124 may allow computer system 1100 to communicate with remote devices 1128 over communications path 1126, which may be wired and/or wireless, and which may include any combination of LANs, WANs, the Internet, etc. Control logic and/or data may be transmitted to and from computer system 1100 via communication path 1126.

In some embodiments, a tangible, non-transitory apparatus or article of manufacture comprising a tangible, non-transitory computer useable or readable medium having control logic (software) stored thereon is also referred to in this document as a computer program product or program storage device. This includes, but is not limited to, computer system 1100, main memory 1106, secondary memory 1110, and removable storage units 1118 and 1122, as well as tangible articles of manufacture embodying any combination of the foregoing. Such control logic, when executed by one or more data processing devices (such as computer system 1100), causes such data processing devices to operate as described in this document.

Based on the teachings contained in this disclosure, it will be apparent to persons skilled in the relevant art(s) how to make and use embodiments of this disclosure using data processing devices, computer systems and/or computer architectures other than that shown in FIG. 11. In particular, embodiments can operate with software, hardware, and/or operating system implementations other than those described in this document.

Terms that are relevant to this disclosure include:

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "object," when referring to an object that is detected by a vehicle perception system or simulated by a simulation system, is intended to encompass both stationary objects and moving (or potentially moving) actors, except where specifically stated otherwise by use of the term "actor" or "stationary object."

When used in the context of autonomous vehicle motion planning, the term "trajectory" refers to the plan that the vehicle's motion planning system will generate, and which the vehicle's motion control system will follow when controlling the vehicle's motion. A trajectory includes the vehicle's planned position and orientation at multiple points in time over a time horizon, as well as the vehicle's planned steering wheel angle and angle rate over the same time horizon. An autonomous vehicle's motion control system will consume the trajectory and send commands to the vehicle's steering controller, brake controller, throttle controller and/or other motion control subsystem to move the vehicle along a planned path.

A "trajectory" of an actor that a vehicle's perception or prediction systems may generate refers to the predicted path that the actor will follow over a time horizon, along with the predicted speed of the actor and/or position of the actor along the path at various points along the time horizon.

In this document, the terms "street," "lane," "road" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" or "road" may represent an airway and a lane may be a portion of the airway. If the autonomous vehicle is a watercraft, then the term "street" or "road" may represent a waterway and a lane may be a portion of the waterway.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes example embodiments for example fields and applications, it should be understood that the disclosure is not limited to the disclosed examples. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described in this document. Further, embodiments (whether or not explicitly described) have significant utility to fields and applications beyond the examples described in this document.

Embodiments have been described in this document with the aid of functional building blocks illustrating the implementation of specified functions and relationships. The boundaries of these functional building blocks have been arbitrarily defined in this document for the convenience of the description. Alternate boundaries can be defined as long as the specified functions and relationships (or their equivalents) are appropriately performed. Also, alternative embodiments can perform functional blocks, steps, operations, methods, etc. using orderings different than those described in in this document.

The features from different embodiments disclosed herein may be freely combined. For example, one or more features from a method embodiment may be combined with any of the system or product embodiments. Similarly, features from a system or product embodiment may be combined with any of the method embodiments herein disclosed.

References in this document to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described in this document. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The features from different embodiments disclosed herein may be freely combined. For example, one or more features from a method embodiment may be combined with any of the system or product embodiments. Similarly, features from a system or product embodiment may be combined with any of the method embodiments herein disclosed.

The breadth and scope of this disclosure should not be limited by any of the above-described example embodiments but should be defined only in accordance with the following claims and their equivalents.

As described above, this document discloses system, method, and computer program product embodiments for operating a lidar system. The system embodiments include a processor or computing device implementing the methods for operating a lidar. The computer program embodiments include programming instructions, for example, stored in a memory, to cause a processor to perform the data management methods described in this document. The system embodiments also include a processor which is configured to perform the methods described in this document, for example, via the programming instructions. More generally, the system embodiments include a system comprising means to perform the steps of the any of the methods described in this document.

As described above, this document discloses system, method, and computer program product embodiments for operating a lidar system. The system embodiments include, for example, a light emitter, photodetectors, a processor and/or memory. The computer program embodiments include programming instructions, for example, stored in a memory, to cause a processor to perform the data management methods described in this document. The system embodiments also include a processor which is configured to perform the methods described in this document, e.g., via the programming instructions. More generally, the system embodiments include a system comprising means to perform the steps of the any of the methods described in this document.

In various embodiments, the methods include: performing operations by each of a plurality of photodetectors to facilitate measurements associated with a light signal reflected off an object external to the lidar system; receiving, by a processor, result values from the photodetectors that indicate times when the photodetectors detect photons at or near a target wavelength; combining, by the processor, different sets of the result values to generate super pixels; using, by the processor, the super pixels to obtain first spatiotemporal coherence metrics; selecting, by the processor, a subset of light pulses or a group of results values based on the first spatiotemporal coherence metrics; detecting, by the processor, a distance between the lidar system and the object based on the selected subset of light pulses or the selected group of results values; and/or causing, by the processor, the distance to be used to control operations of a vehicle.

The first spatiotemporal coherence metrics can include, but are not limited to, a distribution comparison metric, a time of flight statistic metric, and/or a detection confidence score. In the distribution comparison metric scenario, the first spatiotemporal coherence metrics may comprise metrics that each specify a change in distribution between detections of two pulses or two groups of pulses by the plurality of photodetectors, and the subset of light pulses or the group of result values is selected based on a greatest one of the metrics. In the time of flight statistic metric scenario, the first spatiotemporal coherence metrics comprise a measured variance for each pulse of differences between consecutive timestamps that have been sorted from lowest value to highest value or highest value to lowest value, and the subset of light pulses or the group of result values which is selected comprises light pulses or result values that are associated with relatively low measured variances. In the detection confidence score scenario, the first spatiotemporal coherence metrics comprise a score for each pulse of the light signal that indicates a confidence or validity of an object detection, and said pulse is selected for inclusion in the subset when the score exceeds a value.

The first spatiotemporal coherence metrics may be obtained by considering the super pixels for a fixed number of pulses of the light signal or a variable number of pulses of the light signal. In the later case, the methods can also comprise using second spatiotemporal coherence metrics to obtain a value for the variable number of pulses that are to be considered for obtaining first spatiotemporal coherence metrics. The second spatiotemporal coherence metrics comprise at least one of a distribution comparison metric, a time of flight statistic metric, and a detection confidence score.

The implementing systems can comprise: a processor; and a non-transitory computer-readable medium comprising programming instructions that are configured to cause the processor to implement a method for operating an automated system. The above-described methods can also be implemented by a computer program product comprising memory and programming instructions that are configured to cause a processor to perform operations.

What is claimed is:

1. A method for operating a lidar system, comprising:

receiving, by a processor, result values from a plurality of photodetectors that indicate times when the plurality of photodetectors detect photons at or near a target wavelength, the result values being based on operations performed by each of the plurality of photodetectors to facilitate measurements associated with a light signal reflected off an object external to the lidar system;

combining, by the processor, different sets of the result values to generate super pixels;

using, by the processor, the super pixels to obtain first spatiotemporal coherence metrics;

selecting, by the processor, a subset of light pulses or a group of results values based on the first spatiotemporal coherence metrics; and detecting, by the processor, a distance between the lidar system and the object based on the selected subset of light pulses or the selected group of results values.

2. The method according to claim 1, further comprising causing, by the processor, the distance to be used to control operations of a vehicle.

3. The method according to claim 1, wherein the first spatiotemporal coherence metrics comprise at least one of a distribution comparison metric, a time of flight statistic metric, and a detection confidence score.

4. The method according to claim 1, wherein the first spatiotemporal coherence metrics comprise metrics that each specify a change in distribution between detections of two pulses or two groups of pulses by the plurality of photodetectors, and the subset of light pulses or the group of result values is selected based on a greatest one of the metrics.

5. The method according to claim 1, wherein the first spatiotemporal coherence metrics comprise, for each pulse, a measured variance of differences between consecutive timestamps that have been sorted from lowest value to highest value or highest value to lowest value, and the subset of light pulses or the group of result values which is selected comprises light pulses or result values that are associated with relatively low measured variances.

6. The method according to claim 1, wherein the first spatiotemporal coherence metrics comprise a score for each pulse of the light signal that indicates a confidence or validity of an object detection, and said pulse is selected for inclusion in the subset when the score exceeds a value.

7. The method according to claim 1, wherein the first spatiotemporal coherence metrics are obtained by considering the super pixels for a fixed number of pulses of the light signal.

8. The method according to claim 1, wherein the first spatiotemporal coherence metrics are obtained by considering super pixels for a variable number of pulses of the light signal.

9. The method according to claim 8, further comprising using second spatiotemporal coherence metrics to obtain a value for the variable number of pulses that are to be considered for obtaining first spatiotemporal coherence metrics.

10. The method according to claim 9, wherein the second spatiotemporal coherence metrics comprise at least one of a distribution comparison metric, a time of flight statistic metric, and a detection confidence score.

11. A system, comprising:

a processor;

a non-transitory computer-readable storage medium comprising programming instructions that are configured to cause the processor to implement a method for operating a lidar system, wherein the programming instructions comprise instructions to:

receive result values from photodetectors that indicate times when the photodetectors detect photons at or near a target wavelength;

combine different sets of the result values to generate super pixels;

use the super pixels to obtain first spatiotemporal coherence metrics;

select a subset of light pulses or a group of results values based on the first spatiotemporal coherence metrics; and detect a distance between the lidar system and an object based on the selected subset of light pulses or the selected group of results values.

12. The system according to claim 11, wherein the first spatiotemporal coherence metrics comprise metrics that each specify a change in distribution between detections of two pulses or two groups of pulses by the plurality of photodetectors, and the subset of light pulses or the group of result values is selected based on a greatest one of the metrics.

13. The system according to claim 11, wherein the first spatiotemporal coherence metrics comprise, for each pulse, a measured variance of differences between consecutive timestamps that have been sorted from lowest value to highest value or highest value to lowest value, and the subset of light pulses or the group of result values which is selected comprises light pulses or result values that are associated with relatively low measured variances.

14. The system according to claim 11, wherein the first spatiotemporal coherence metrics comprise a score for each pulse of a light signal that indicates a confidence or validity of an object detection, and said pulse is selected for inclusion in the subset when the score exceeds a value.

15. The system according to claim 11, wherein the first spatiotemporal coherence metrics are obtained by considering the super pixels for a fixed number of pulses of a light signal.

16. The system according to claim 11, wherein the first spatiotemporal coherence metrics are obtained by considering super pixels for a variable number of pulses of a light signal.

17. The system according to claim 16, the programming instructions comprise instructions to use second spatiotemporal coherence metrics to obtain a value for the variable number of pulses that are to be considered for obtaining first spatiotemporal coherence metrics.

18. A non-transitory computer-readable medium that stores instructions that are configured to, when executed by at least one computing device, cause the at least one computing device to perform operations comprising:

receiving, result values from photodetectors that indicate times when the photodetectors detect photons at or near a target wavelength;

combining different sets of the result values to generate super pixels;

using the super pixels to obtain spatiotemporal coherence metrics;

selecting a subset of light pulses or a group of results values based on the spatiotemporal coherence metrics; and detecting a distance between a lidar system and the object based on the selected subset of light pulses or the selected group of results values.

19. The non-transitory computer-readable medium according to claim 18, wherein the spatiotemporal coherence metrics comprise at least one of a distribution comparison metric, a time of flight statistic metric, and a detection confidence score.

20. The non-transitory computer-readable medium according to claim 18, wherein the further comprising instructions to obtain the spatiotemporal coherence metrics by considering the super pixels for a fixed number of pulses of the light signal or a variable number of pulses of a light signal.

* * * * *